(12) United States Patent
Iwata et al.

(10) Patent No.: US 11,827,451 B2
(45) Date of Patent: Nov. 28, 2023

(54) ARTICLE TRANSPORT APPARATUS

(71) Applicant: Daifuku Co., Ltd., Osaka (JP)

(72) Inventors: Masashige Iwata, Hinocho (JP); Hirotaka Osako, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 113 days.

(21) Appl. No.: 17/612,072

(22) PCT Filed: Apr. 6, 2020

(86) PCT No.: PCT/JP2020/015532
§ 371 (c)(1),
(2) Date: Nov. 17, 2021

(87) PCT Pub. No.: WO2020/235238
PCT Pub. Date: Nov. 26, 2020

(65) Prior Publication Data
US 2022/0204271 A1    Jun. 30, 2022

(30) Foreign Application Priority Data

May 20, 2019    (JP) ................................ 2019-094559

(51) Int. Cl.
*B65G 1/137*    (2006.01)
(52) U.S. Cl.
CPC ................... *B65G 1/1375* (2013.01)
(58) Field of Classification Search
CPC .................................................. B65G 1/1375
See application file for complete search history.

(56) References Cited

U.S. PATENT DOCUMENTS

| | | | | |
|---|---|---|---|---|
| 5,839,872 A | * | 11/1998 | Goto | B65G 1/0435 |
| | | | | 414/280 |
| 6,321,147 B1 | * | 11/2001 | Takeda | G05D 1/0038 |
| | | | | 701/448 |
| 7,920,962 B2 | * | 4/2011 | D'Andrea | G05D 1/0212 |
| | | | | 701/410 |

(Continued)

FOREIGN PATENT DOCUMENTS

| | | |
|---|---|---|
| EP | 0647575 A1 | 4/1995 |
| JP | 2000118626 A | 4/2000 |

(Continued)

*Primary Examiner* — Kyle O Logan
(74) *Attorney, Agent, or Firm* — THE WEBB LAW FIRM

(57) ABSTRACT

A transfer apparatus (7) includes a first protruding/retracting unit (21), a second protruding/retracting unit (22), and a control unit. The first protruding/retracting unit (21) includes a first arm (27A) that protrudes and retracts in a transfer direction, and a first hook (31) that swings around a first axis (P1). The second protruding/retracting unit (22) includes a second arm (27B) that protrudes and retracts in the transfer direction, and a second hook (32) that swings around a second axis (P2). A spacing changing unit is configured to change a spacing between the first arm (27A) and the second arm (27B) to a first spacing (D1) that is narrower than the sum of a first intermediate-state protrusion amount and a second intermediate-state protrusion amount and is wider than the sum of a first transferring-state protrusion amount and a second transferring-state protrusion amount.

10 Claims, 14 Drawing Sheets

(56) References Cited

U.S. PATENT DOCUMENTS

| | | | | |
|---|---|---|---|---|
| 2006/0229803 | A1* | 10/2006 | Shimamura | G05D 1/0261 701/532 |
| 2007/0294029 | A1* | 12/2007 | D'Andrea | G01C 21/005 701/410 |
| 2008/0009964 | A1* | 1/2008 | Bruemmer | G06N 3/008 700/245 |
| 2008/0051985 | A1* | 2/2008 | D'Andrea | G05D 1/0291 701/410 |
| 2012/0083964 | A1* | 4/2012 | Montemerlo | B60T 8/17 701/25 |
| 2013/0238117 | A1* | 9/2013 | Yagawa | G05B 19/41895 700/228 |
| 2014/0358338 | A1* | 12/2014 | Harasaki | B61L 23/042 701/19 |
| 2016/0174453 | A1* | 6/2016 | Matsuzaki | G05D 1/0295 701/2 |
| 2016/0347551 | A1* | 12/2016 | Nishikawa | B65G 43/00 |
| 2017/0341862 | A1* | 11/2017 | Aschauer | B65G 1/0435 |

FOREIGN PATENT DOCUMENTS

| | | |
|---|---|---|
| JP | 2012184085 A | 9/2012 |
| JP | 201660624 A | 4/2016 |

\* cited by examiner

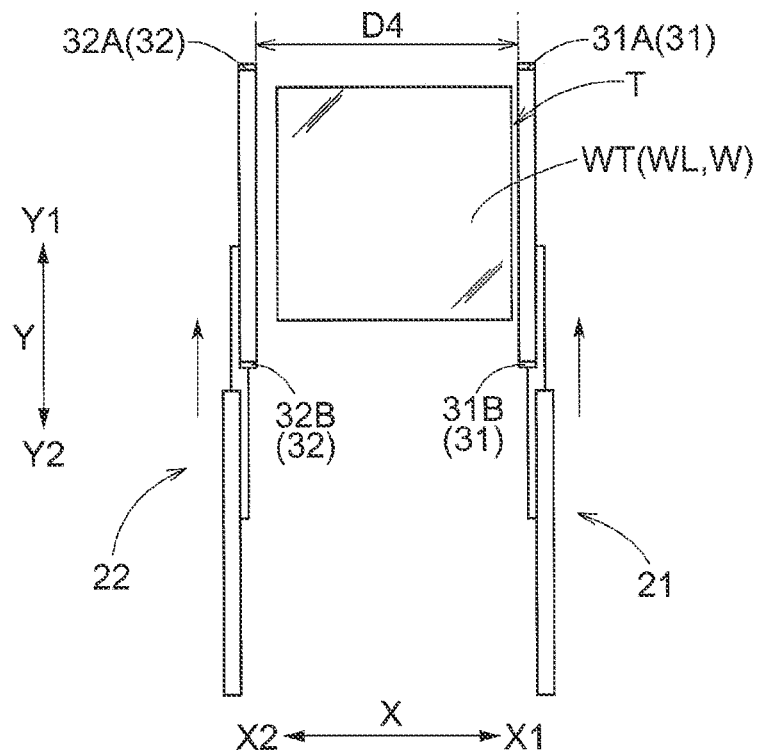
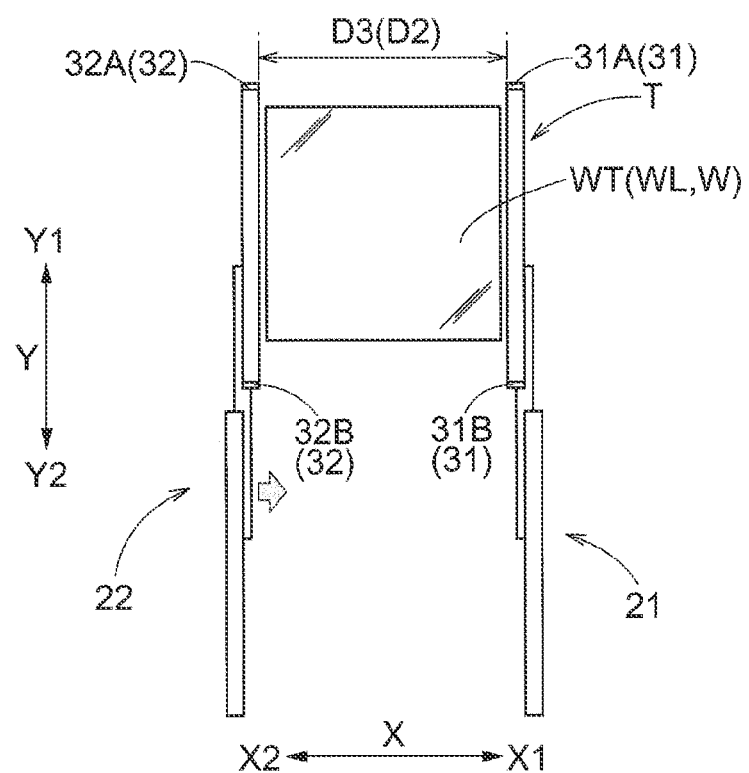

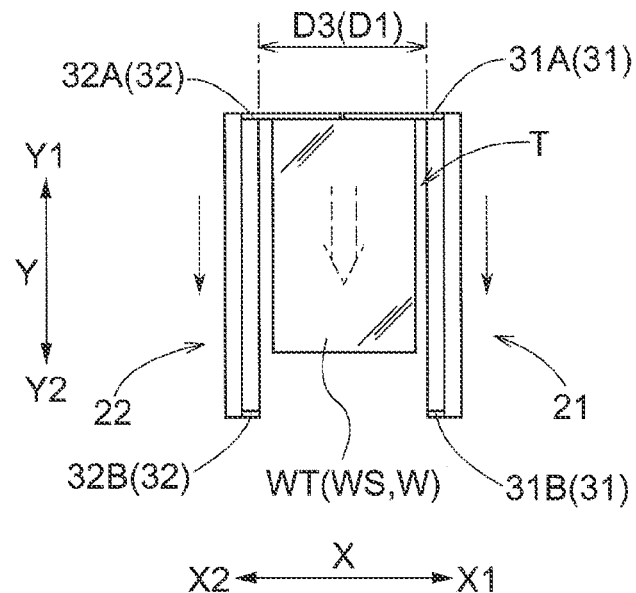
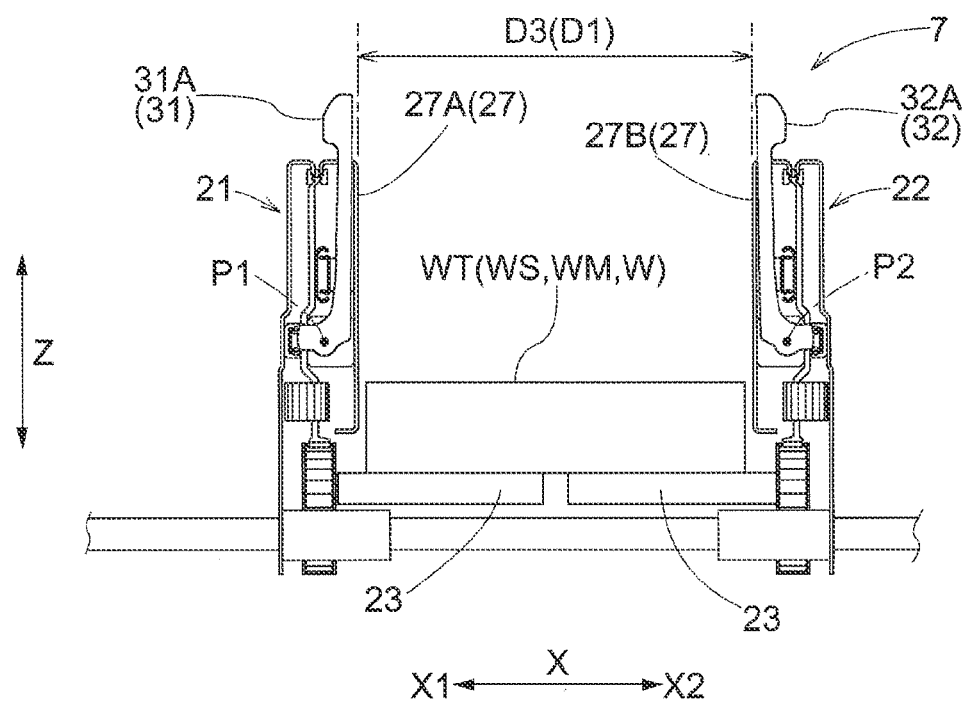

ARTICLE TRANSPORT APPARATUS

CROSS-REFERENCE TO RELATED APPLICATIONS

This application is the United States national phase of International Application No. PCT/JP2020/015532 filed Apr. 6, 2020, and claims priority to Japanese Patent Application No. 2019-094559 filed May 20, 2019, the disclosures of which are hereby incorporated by reference in their entirety.

BACKGROUND OF THE INVENTION

Field of the Invention

The present invention relates to an article transport apparatus that includes a transfer apparatus for moving an article in a transfer direction and a movement apparatus for moving the transfer apparatus along a transport path.

Description of Related Art

As such an article transport apparatus, for example, the article transport apparatus described in JP 2016-060624A (Patent Document 1) is known. Hereinafter, in the description of background art, reference signs or names in parentheses are the reference signs or names in the prior art document. With this article transport apparatus disclosed in Patent Document 1, a transfer apparatus includes a first protruding/retracting unit (a fixed slide apparatus 15b) capable of protruding and retracting in a transfer direction, a second protruding/retracting unit (a moving slide apparatus 15a) capable of protruding and retracting in the transfer direction (a second direction Y) and installed, spaced apart from the first protruding/retracting unit, on a width direction second side (HP side) with respect to the first protruding/retracting unit, a support portion (an article support base 14) that supports an article, and a spacing changing unit. The first protruding/retracting unit includes a first arm (a leading-end member 20) that protrudes and retracts in the transfer direction, and a first hook (hook 29a) that is supported by the first arm and swings around a first axis. The second protruding/retracting unit includes a second arm (leading-end member 20) that protrudes and retracts in the transfer direction, and a second hook (hook 29a) that is supported by the second arm and swings around a second axis. The first hook swings around the first axis to change the orientation thereof between a first retracting orientation and a first transferring orientation in which the first hook protrudes farther toward the width direction second side than in the first retracting orientation. The second hook swings around the second axis to change the orientation thereof between a second retracting orientation and a second transferring orientation in which the second hook protrudes farther toward a width direction first side than in the second retracting orientation.

Moreover, with the article transport apparatus disclosed in Patent Document 1, the article can be moved in the transfer direction when the spacing changing unit sets the spacing between the first protruding/retracting unit and the second protruding/retracting unit to a spacing that corresponds to the size of the article in the width direction, and the first arm and the second arm protrude and retract in a state in which the first hook is in the first transferring orientation and the second hook is in the second transferring orientation. With the article transport apparatus disclosed in Patent Document 1, the spacing changing unit widens the spacing between the first protruding/retracting unit and the second protruding/retracting unit, and the first arm and the second arm protrude and retract in a state in which the first hook is in the first retracting orientation and the second hook is in the second retracting orientation, thereby causing the first arm and the second arm to protrude and retract without interference between the first and second hooks and the article.

Patent Document 1: JP 2016-060624A

SUMMARY OF THE INVENTION

With the article transport apparatus as disclosed in Patent Document 1, the installation positions of the first axis and the second axis in the vertical direction may be limited due to the sizes, arrangements, and the like of members installed around the first axis and the second axis. Moreover, the leading-end portion of the first hook in the first transferring orientation and the leading-end portion of the second hook in the second transferring orientation need to be positioned at desired heights based on the size or shape of an article. Accordingly, the swinging paths of the first hook and the second hook may be determined such that, for example, the first hook is in a first intermediate orientation in which the first hook protrudes from the first arm farthest toward the width direction second side while changing the orientation thereof between the first retracting orientation and the first transferring orientation, and the second hook is in a second intermediate orientation in which the second hook protrudes from the second arm farthest toward the width direction first side while changing the orientation thereof between the second retracting orientation and the second transferring orientation.

In such a case, it is necessary to prevent the first hook in the first transferring orientation and the second hook in the second transferring orientation from interfering with each other, and the first hook in the first intermediate orientation and the second hook in the second intermediate orientation from interfering with each other. Accordingly, the first hook in the first transferring orientation and the second hook in the second transferring orientation need to be spaced apart from each other in the width direction, and the first hook in the first transferring orientation and the second hook in the second transferring orientation cannot appropriately transfer the article in some cases, depending on the size or shape of the article.

It is desired to realize an article transport apparatus in which the spacing in the width direction between the first hook in the first transferring orientation and the second hook in the second transferring orientation can be narrowed.

In consideration of the above matters, a characteristic configuration of an article transport apparatus includes: a transfer apparatus for moving an article in a transfer direction; and a movement apparatus for moving the transfer apparatus along a transport path, a direction orthogonal to the transfer direction when viewed in a vertical direction being defined as a width direction, one side in the width direction being defined as a width direction first side, a side opposite thereto being defined as a width direction second side, the transfer apparatus including: a first protruding/retracting unit capable of protruding and retracting in the transfer direction; a second protruding/retracting unit capable of protruding and retracting in the transfer direction and installed spaced apart from the first protruding/retracting unit on the width direction second side; a support portion for supporting an article; a spacing changing unit; and a control unit, the first protruding/retracting unit including: a first arm that protrudes and retracts in the transfer direction; and a first hook that is supported by the first arm and swings around a first axis extending in the transfer direction, the second protruding/retracting unit including: a second arm that protrudes and retracts in the transfer direction; and a second hook that is supported by the second arm and swings around a second axis extending in the transfer direction, the first hook being capable of swinging around the first axis to change an orientation thereof between a first retracting orientation, a first intermediate orientation, and a first transferring orientation in which an amount of protrusion from the first arm toward the width direction second side is larger than that in the first retracting orientation, the first intermediate orientation being located between the first retracting orientation and the first transferring orientation in a swinging path of the first hook, the first hook in the first intermediate orientation protruding from the first arm farthest toward the width direction second side, the second hook being capable of swinging around the second axis to change an orientation thereof between a second retracting orientation, a second intermediate orientation, and a second transferring orientation in which an amount of protrusion from the second arm toward the width direction first side is larger than that in the second retracting orientation, the second intermediate orientation being located between the second retracting orientation and the second transferring orientation in a swinging path of the second hook, the second hook in the second intermediate orientation protruding from the second arm farthest toward the width direction first side, an amount of protrusion of the first hook in the first intermediate orientation from the first arm toward the width direction second side being defined as a first intermediate-state protrusion amount, an amount of protrusion of the first hook in the first transferring orientation from the first arm toward the width direction second side being defined as a first transferring-state protrusion amount, an amount of protrusion of the second hook in the second intermediate orientation from the second arm toward the width direction first side being defined as a second intermediate-state protrusion amount, an amount of protrusion of the second hook in the second transferring orientation from the second arm toward the width direction first side being defined as a second transferring-state protrusion amount, the spacing changing unit being configured to change a spacing between the first arm and the second arm to a first spacing that is narrower than a sum of the first intermediate-state protrusion amount and the second intermediate-state protrusion amount and is wider than a sum of the first transferring-state protrusion amount and the second transferring-state protrusion amount, and the control unit performing an operation of changing the orientation of the first hook between the first retracting orientation and the first transferring orientation and an operation of changing the orientation of the second hook between the second retracting orientation and the second transferring orientation at different times.

With this characteristic configuration, the spacing changing unit changes the spacing in the width direction between the first protruding/retracting unit and the second protruding/retracting unit, and thus the spacing therebetween in the width direction can be set to a spacing that corresponds to the size of an article in the width direction. Then, the article between the first protruding/retracting unit and the second protruding/retracting unit can be transferred between the support portion and a target location by causing the first protruding/retracting unit and the second protruding/retracting unit to protrude and retract in the transfer direction in the state in which the spacing between the first protruding/retracting unit and the second protruding/retracting unit is set to a spacing that corresponds to the size of the article in the width direction.

The spacing changing unit can change the spacing between the first arm and the second arm to the first spacing that is narrower than the sum of the first intermediate-state protrusion amount and the second intermediate-state protrusion amount. Even when the spacing between the first arm and the second arm is set to the first spacing, the first hook and the second hook can be appropriately prevented from interfering with each other by performing an operation of changing the orientation of the first hook and an operation of changing the orientation of the second hook at different times. Accordingly, the spacing in the width direction between the first hook in the first transferring orientation and the second hook in the second transferring orientation can be narrowed while preventing the first hook and the second hook from interfering with each other.

BRIEF DESCRIPTION OF THE DRAWINGS

FIG. 10 is a plan view illustrating operation of a first protrusion control when a target article is a wide article.
FIG. 11 is a plan view illustrating operation of an approach control when the target article is a wide article.
FIG. 18 is a plan view illustrating operation of the first withdrawal control when the target article is a narrow article.
FIG. 19 is a front view illustrating operation of a second tilting control.

DETAILED DESCRIPTION OF PREFERRED EMBODIMENTS

1. Embodiment

An embodiment of an article transport facility provided with an article transport apparatus will be described with reference to the drawings.

Figure 1:
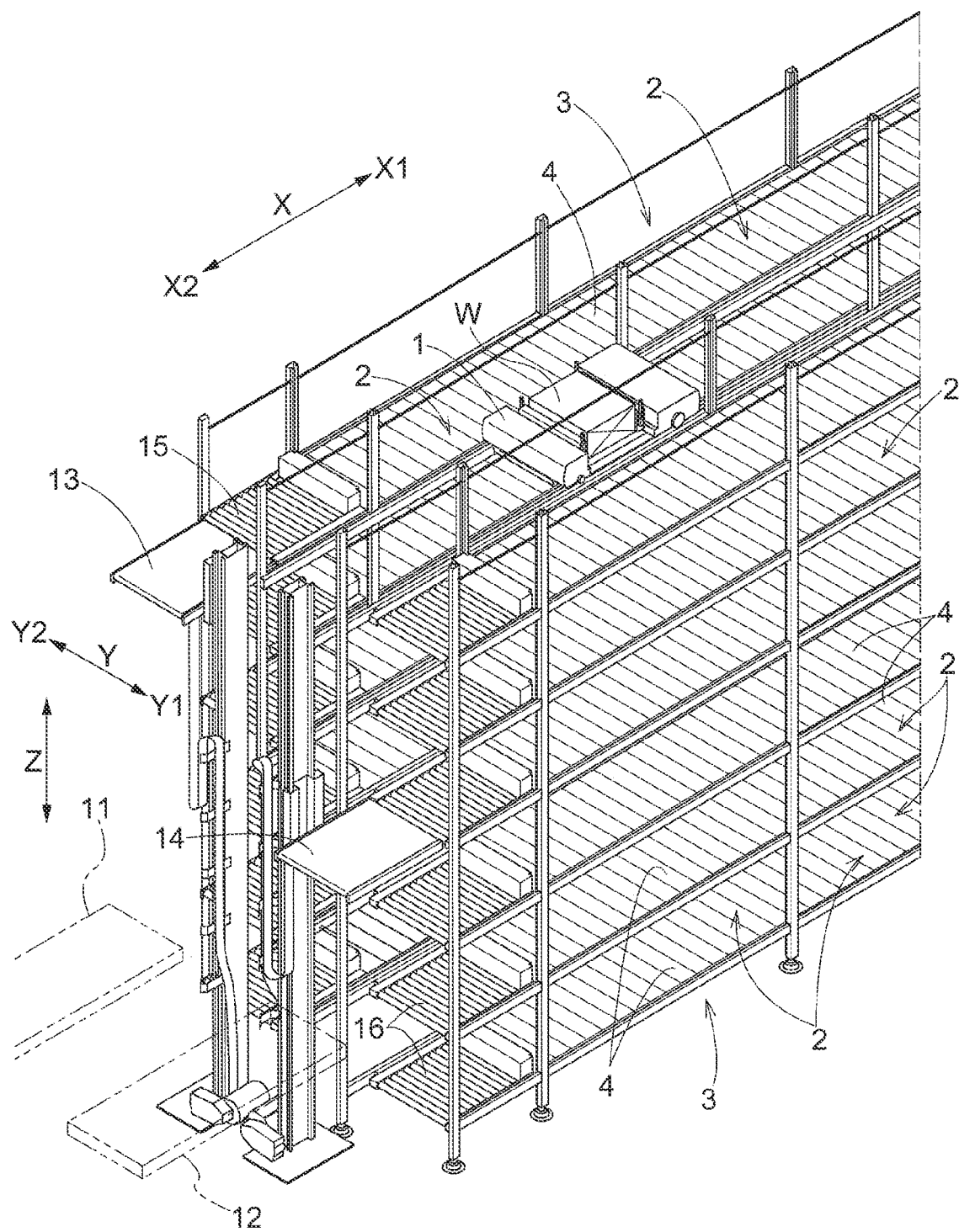
FIG. 1 is a perspective view of an article transport facility.

As shown in FIG. 1, the article transport facility includes an article transport vehicle 1 serving as an article transport apparatus that travels in a first direction X and transports an article W, and article storage shelves 3 that each include a plurality of storage units 2. Hereinafter, one side in the first direction X is referred to as a first direction first side X1, and the side opposite thereto is referred to as a first direction second side X2. Further, a direction orthogonal to the first direction X when viewed in the vertical direction in a vertical direction Z is referred to as a second direction Y, one side in the second direction Y is referred to as a second direction first side Y1, and the side opposite thereto is referred to as a second direction second side Y2. Note that the first direction X corresponds to a width direction, and the second direction Y corresponds to a transfer direction. The first direction first side X1 corresponds to a width direction first side, and the first direction second side X2 corresponds to a width direction second side. Note that the first direction X is also the travel direction of the article transport vehicle 1. The second direction Y is also the depth direction of the article storage shelves 3.

A pair of the article storage shelves 3 are installed so as to face each other sandwiching a travel path on which the article transport vehicle 1 travels. Shelf boards 4 are installed in each of the pair of article storage shelves 3 in a state lined up in the vertical direction Z, and the storage units 2 for storing the articles W are formed on the shelf boards 4. Although not shown, a plurality of types of articles W with different sizes in the first direction X and the vertical direction Z are stored on the article storage shelves 3. A plurality of types of articles W with different sizes in the first direction X and the vertical direction Z are included among the articles W transported by the article transport vehicle 1.

A plurality of article transport vehicles 1 are installed corresponding to the plurality of shelf boards 4 lined up in the vertical direction Z. In addition to the pair of article storage shelves 3 and a plurality of article transport vehicles 1, the article transport facility includes a storage conveyor 11 and a retrieval conveyor 12, a storage lift apparatus 13 and a retrieval lift apparatus 14 that are capable of rising and lowering in the vertical direction Z, and storage relay conveyors 15 and retrieval relay conveyors 16 that are installed corresponding to the plurality of shelf boards 4 lined up in the vertical direction Z.

In the article transport facility, an article W transported by the storage conveyor 11 is transported onto one of the plurality of storage relay conveyors 15 by the storage lift apparatus 13. Then, the article W supported by one of the plurality of storage relay conveyors 15 is transported onto the shelf board 4 corresponding to this storage relay conveyor 15 by the article transport vehicle 1 corresponding to this storage relay conveyor 15. Further, in the article transport facility, an article W on the shelf board 4 is transported onto the retrieval relay conveyor 16 corresponding to this shelf board 4 by the article transport vehicle 1 corresponding to this shelf board 4. Then, the article W supported by one of the plurality of retrieval relay conveyors 16 is transported onto the retrieval conveyor 12 by the retrieval lift apparatus 14.

Figure 2:
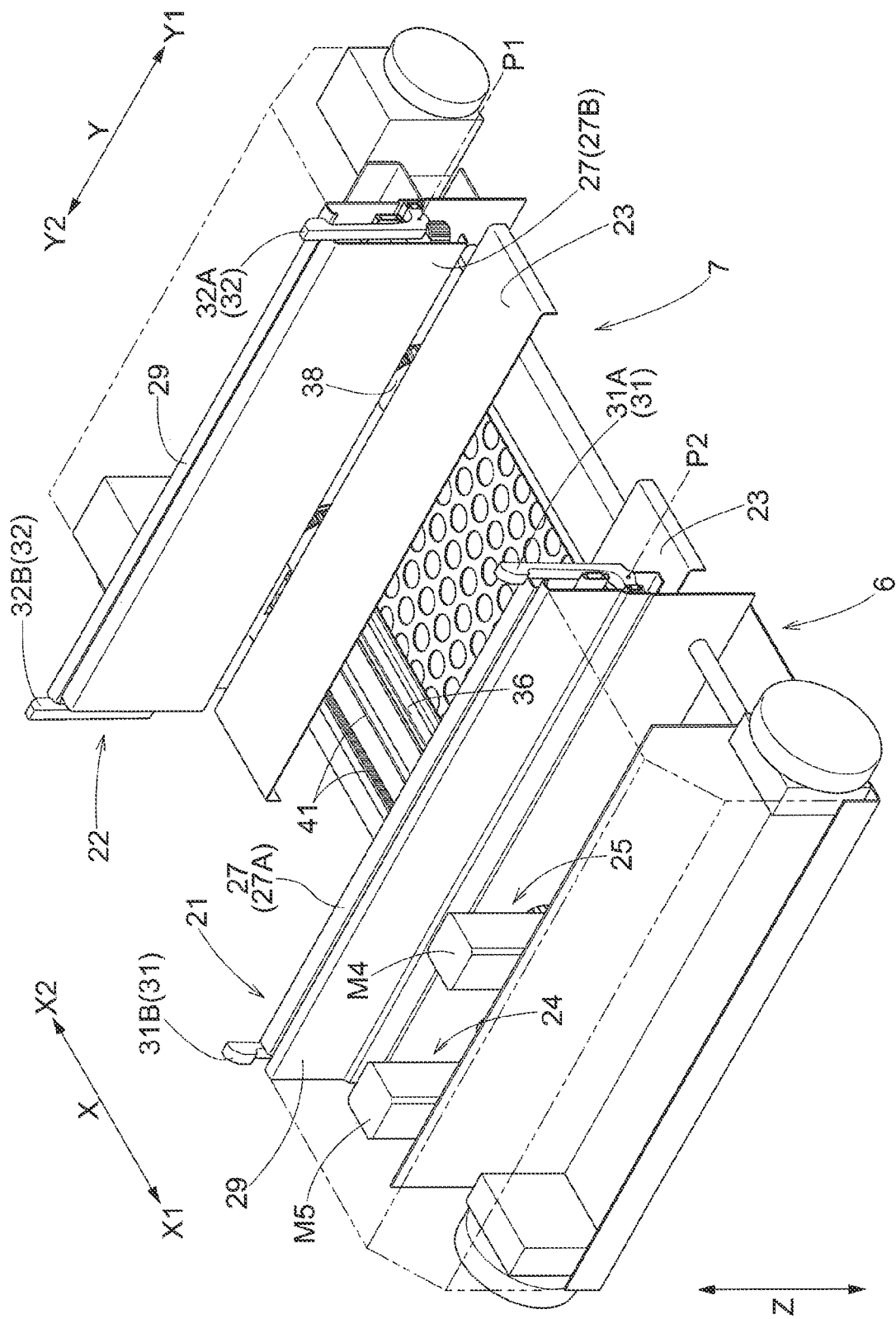
FIG. 2 is a perspective view of a transfer apparatus in a withdrawn state.
Figure 3:
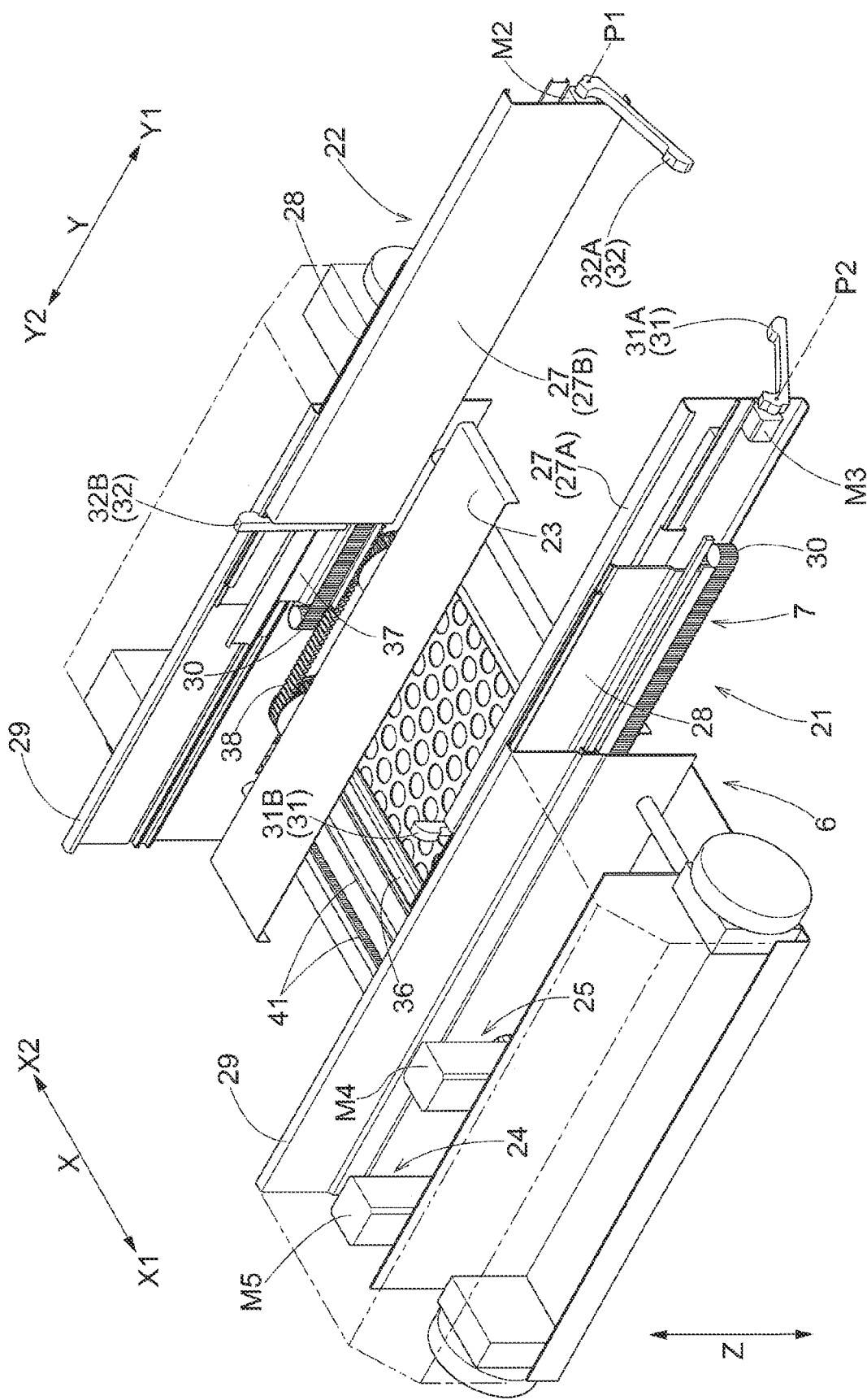
FIG. 3 is a perspective view of the transfer apparatus in a protruding state.
Figure 6:
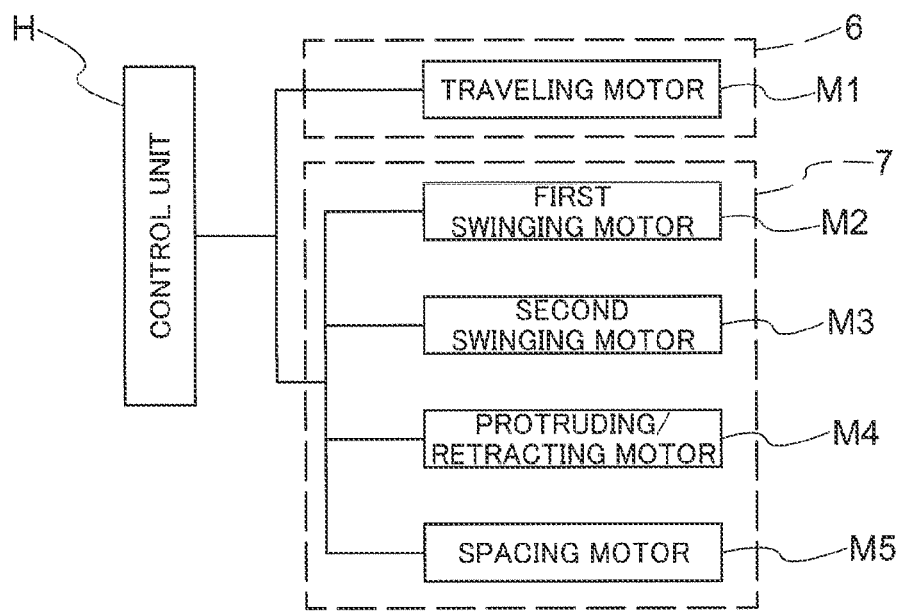
FIG. 6 is a control block diagram.

As shown in FIGS. 2 and 3, the article transport vehicle 1 includes a traveling body 6 that travels in the first direction X, and a transfer apparatus 7 that transfers the article W in the second direction Y. The transfer apparatus 7 is supported by the traveling body 6. Further, as shown in FIG. 6, the article transport vehicle 1 includes a traveling motor M1 that allows the traveling body 6 to travel in the first direction X. The article transport vehicle 1 is configured such that the transfer apparatus 7 supported by the traveling body 6 is moved along the transport path by driving the traveling motor M1 to allow the traveling body 6 to travel in the first direction X. Note that the traveling body 6 corresponds to the movement apparatus.

As shown in FIGS. 2 and 3, the transfer apparatus 7 includes a first protruding/retracting unit 21 that is capable of protruding and retracting in the second direction Y, a second protruding/retracting unit 22 that is capable of protruding and retracting in the second direction Y and is installed spaced apart from the first protruding/retracting unit 21 on the first direction second side X2, a support portion 23 for supporting an article W, a spacing changing unit 24, and a protruding/retracting drive unit 25.

Figure 4:
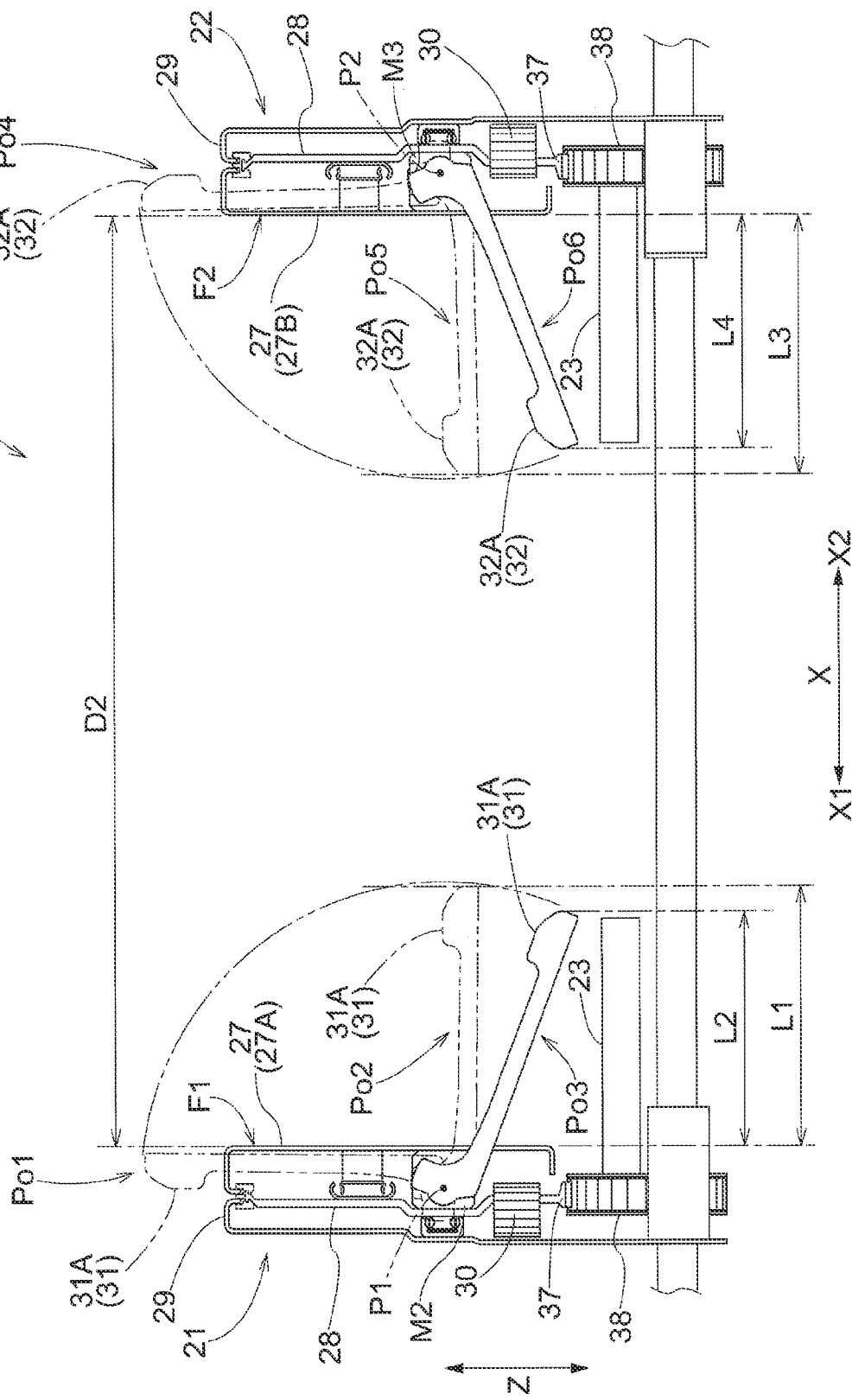
FIG. 4 is a front view of the transfer apparatus with the spacing being set to a second spacing.
Figure 5:
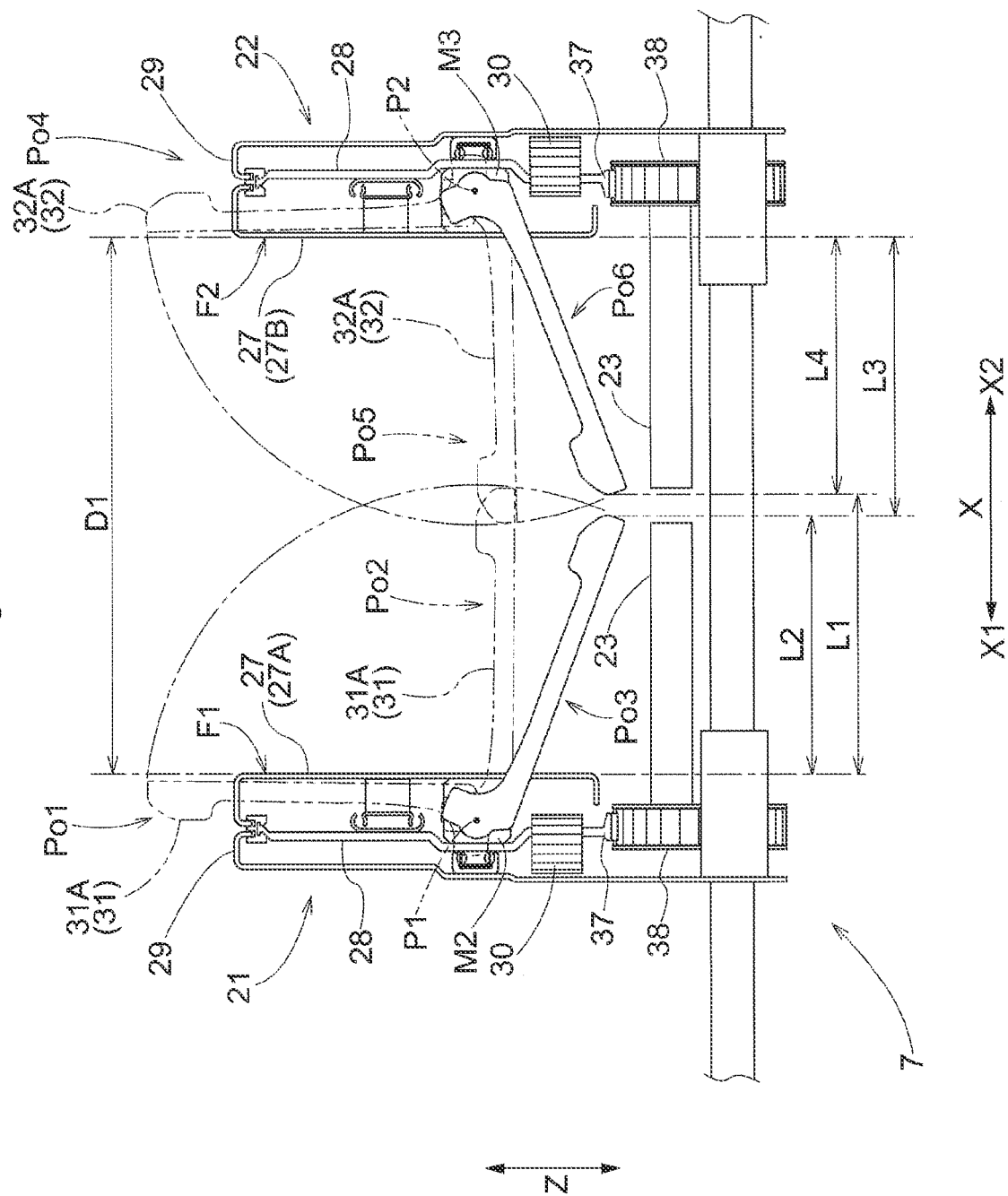
FIG. 5 is a front view of the transfer apparatus with the spacing being set to a first spacing.

As shown in FIGS. 4 and 5, the first protruding/retracting unit 21 includes a first arm 27A that protrudes and retracts in the second direction Y, a first hook 31 that is supported by the first arm 27A and swings around a first axis P1 extending in the transfer direction, and a first swinging motor M2 that swings the first hook 31. The second protruding/retracting unit 22 includes a second arm 27B that protrudes and retracts in the second direction Y, a second hook 32 that is supported by the second arm 27B and swings around a second axis P2 extending in the second direction Y, and a second swinging motor M3 that swings the second hook 32.

More specifically, as shown in FIGS. 2 and 3, each of the first protruding/retracting unit 21 and the second protruding/retracting unit 22 includes a leading-end member 27, a relay member 28 that supports the leading-end member 27 such that the leading-end member 27 is capable of sliding in the second direction Y, a base member 29 that supports the relay member 28 such that the relay member 28 is capable of sliding in the second direction Y, and an interlocking member 30 that interlocks the relay member 28 and the leading-end member 27. The leading-end member 27 of the first protruding/retracting unit 21 corresponds to the first arm 27A that protrudes and retracts in the transfer direction, and the leading-end member 27 of the second protruding/retracting unit 22 corresponds to the second arm 27B that protrudes and retracts in the transfer direction.

In the first protruding/retracting unit 21, the relay member 28 is positioned on the first direction second side X2 with respect to the base member 29, and the leading-end member 27 is positioned on the first direction second side X2 with respect to the relay member 28. In the second protruding/retracting unit 22, the relay member 28 is positioned on the first direction first side X1 with respect to the base member 29, and the leading-end member 27 is positioned on the first direction first side X1 with respect to the relay member 28. As shown in FIG. 3, when the relay member 28 protrudes and retracts with respect to the base member 29 in the second direction Y, the interlocking member 30 interlocks the relay member 28 and the leading-end member 27 so as to cause the leading-end member 27 to protrude and retract with respect to the relay member 28 to the same side to which the relay member 28 protruded and retracted.

As shown in FIGS. 4 and 5, the first hook 31 can swing around the first axis P1 to change the orientation thereof between a first retracting orientation Po1, a first intermediate orientation Po2, and a first transferring orientation Po3 in which the amount of protrusion from the first arm 27A toward the first direction second side X2 is larger than that in the first retracting orientation Po1.

An end portion on the first direction second side X2 of the first hook 31 in the first retracting orientation Po1 (swinging leading-end portion) is located above an end portion thereof on the first direction first side X1 (swinging base-end portion located at the swing center). In this embodiment, the first hook 31 in the first retracting orientation Po1 extends in the vertical direction Z. An end portion on the first direction second side X2 of the first hook 31 in the first transferring orientation Po3 is located below an end portion thereof on the first direction first side X1. The first intermediate orientation Po2 is located between the first retracting orientation Po1 and the first transferring orientation Po3 in the swinging path of the first hook 31, and the first hook 31 in the first intermediate orientation Po2 protrudes from the first arm 27A farthest toward the first direction second side X2. In this embodiment, the first hook 31 in the first intermediate orientation Po2 extends in the first direction X.

That is, in this embodiment, an end portion on the first direction second side X2 of the first hook 31 in the first intermediate orientation Po2 and an end portion thereof on the first direction first side X1 are located at the same height. The first hook 31 is in the first transferring orientation Po3 when swinging downward from the first intermediate orientation Po2 by a first angle that is smaller than 90 degrees (e.g., 30 degrees). The first hook 31 is in the first retracting orientation Po1 when swinging upward from the first intermediate orientation Po2 by a second angle that is larger than the first angle (e.g., 90 degrees).

Here, when a face of the first arm 27A that is located at the end portion on the first direction second side X2 is defined as a first face F1, the first axis P1 is located on the first direction first side X1 with respect to the first face F1. When the first hook 31 is in the first retracting orientation Po1, the entire first hook 31 is located on the first direction first side X1 with respect to the first face F1, and the first hook 31 does not protrude from the first face F1 toward the first direction second side X2. On the other hand, when the first hook 31 is in the first intermediate orientation Po2 and the first transferring orientation Po3, the first hook 31 protrudes toward the first direction second side X2 with respect to the first face F1. In this embodiment, the amount of protrusion of the first hook 31 in the first intermediate orientation Po2 from the first arm 27A (specifically, the first face F1 of the first arm 27A) toward the first direction second side X2 is defined as a first intermediate-state protrusion amount L1, and the amount of protrusion of the first hook 31 in the first transferring orientation Po3 from the first arm 27A (specifically, the first face F1 of the first arm 27A) toward the first direction second side X2 is defined as a first transferring-state protrusion amount L2.

The second hook 32 can swing around the second axis P2 to change the orientation thereof between a second retracting orientation Po4, a second intermediate orientation Po5, and a second transferring orientation Po6 in which the amount of protrusion from the second arm 27B toward the first direction second side X2 is larger than that in the second retracting orientation Po4.

An end portion on the first direction first side X1 of the second hook 32 in the second retracting orientation Po4 (swinging leading-end portion) is located above an end portion thereof on the first direction second side X2 (swinging base-end portion located at the swing center). In this embodiment, the second hook 32 in the second retracting orientation Po4 extends in the vertical direction Z. An end portion of on the first direction first side X1 the second hook 32 in the second transferring orientation Po6 is located below an end portion thereof on the first direction second side X2. The second intermediate orientation Po5 is located between the second retracting orientation Po4 and the second transferring orientation Po6 in the swinging path of the second hook 32, and the second hook 32 in the second intermediate orientation Po5 protrudes from the second arm 27B farthest toward the first direction first side X1. In this embodiment, the second hook 32 in the second intermediate orientation Po5 extends in the first direction X.

That is, in this embodiment, an end portion on the first direction first side X1 of the second hook 32 in the second intermediate orientation Po5 and an end portion thereof on the first direction second side X2 are located at the same height. The second hook 32 is in the second transferring orientation Po6 when swinging downward from the second intermediate orientation Po5 by a third angle that is smaller than 90 degrees (e.g., 30 degrees). The second hook 32 is in the second transferring orientation Po6 when swinging upward from the second intermediate orientation Po5 by a fourth angle that is larger than the third angle (e.g., 90 degrees).

Here, when a face of the second arm 27B that is located at the end portion on the first direction first side X1 is defined as a second face F2, the second axis P2 is located on the first direction second side X2 with respect to the second face F2. When the second hook 32 is in the second retracting orientation Po4, the entire second hook 32 is located on the first direction second side X2 with respect to the second face F2, and the second hook 32 does not protrude from the second face F2 toward the first direction first side X1. On the other hand, when the second hook 32 is in the second intermediate orientation Po5 and the second transferring orientation Po6, the second hook 32 protrudes toward the first direction first side X1 with respect to the second face F2. In this embodiment, the amount of protrusion of the second hook 32 in the second intermediate orientation Po5 from the second arm 27B (specifically, the second face F2 of the second arm 27B) toward the first direction first side X1 is defined as a second intermediate-state protrusion amount L3, and the amount of protrusion of the second hook 32 in the second transferring orientation Po6 from the second arm 27B (specifically, the second face F2 of the second arm 27B) toward the first direction first side X1 is defined as a second transferring-state protrusion amount L4.

As shown in FIGS. 2 and 3, the first hook 31 is provided at each of the two end portions of the first arm 27A in the second direction Y. The second hook 32 is provided at each of the two end portions of the second arm 27B in the second direction Y. Hereinafter, the first hook 31 provided at the end portion of the first arm 27A on the second direction first side Y1 is referred to as a "first-side first hook 31A", and the first hook 31 provided at the end portion of the first arm 27A on the second direction second side Y2 is referred to as a "second-side first hook 31B". Further, the second hook 32 provided at the end portion of the second arm 27B on the second direction first side Y1 is referred to as a "first-side second hook 32A", and the second hook 32 provided at the end portion of the second arm 27B on the second direction second side Y2 is referred to as a "second-side second hook 32B".

In this embodiment, as shown in FIGS. 19 to 22, when the lowest article W among target articles WT that are articles W to be transferred by the transfer apparatus 7 is defined as a low article WM, the first axis P1 and the second axis P2 are arranged above the upper end of the low article WM supported by the support portion 23. Note that the first axis P1 and the second axis P2 are arranged at the same height.

As shown in FIGS. 2 and 3, the protruding/retracting drive unit 25 changes the state of the first protruding/retracting unit 21 and the second protruding/retracting unit 22 between a withdrawn state in which the first protruding/retracting unit 21 and the second protruding/retracting unit 22 are withdrawn on the traveling body 6 (see FIG. 2), and a protruding state in which the first protruding/retracting unit 21 and the second protruding/retracting unit 22 protrude in the second direction Y with respect to the traveling body 6 (see FIG. 3). The protruding state includes a protruding state in which the first protruding/retracting unit 21 and the second protruding/retracting unit 22 protrude toward the second direction first side Y1 (see FIG. 3), and a protruding state in which the first protruding/retracting unit 21 and the second protruding/retracting unit 22 protrude toward the second direction second side Y2 (not shown).

As shown in FIGS. 2 and 3, the protruding/retracting drive unit 25 includes a protruding/retracting drive shaft 36, a protruding/retracting motor M4 that drives the protruding/retracting drive shaft 36 to rotate, and a belt 38 that meshes with a rack 37 (see FIGS. 4 and 5) provided at the lower end of the relay member 28. As shown in FIGS. 4 and 5, the belt 38 is provided corresponding to each of the first protruding/retracting unit 21 and the second protruding/retracting unit 22. The protruding/retracting drive unit 25 drives the protruding/retracting drive shaft 36 to rotate with the protruding/retracting motor M4, and rotates the belt 38 in the longitudinal direction thereof. As a result, the protruding/retracting drive unit 25 moves the relay member 28 of the first protruding/retracting unit 21 and the relay member 28 of the second protruding/retracting unit 22 to the same side in the second direction Y, and thus causes the first protruding/retracting unit 21 and the second protruding/retracting unit 22 to protrude and retract to the same side.

As shown in FIGS. 4 and 5, the spacing changing unit 24 is capable of changing a spacing between the first arm 27A and the second arm 27B in the first direction X. The spacing changing unit 24 can change the spacing between the first arm 27A and the second arm 27B in the first direction X to various spacings corresponding to the sizes of the articles W in the first direction X. Specifically, the spacing changing unit 24 is capable of changing the spacing between the first arm 27A and the second arm 27B in the first direction X to at least a first spacing D1 and a second spacing D2 that is wider than the first spacing D1. As shown in FIG. 5, the first spacing D1 is a spacing between the first arm 27A and the second arm 27B that is narrower than the sum of the first intermediate-state protrusion amount L1 and the second intermediate-state protrusion amount L3 and is wider than the sum of the first transferring-state protrusion amount L2 and the second transferring-state protrusion amount L4. As shown in FIG. 4, the second spacing D2 is wider than the sum of the first intermediate-state protrusion amount L1 and the second intermediate-state protrusion amount L3.

Figure 14:
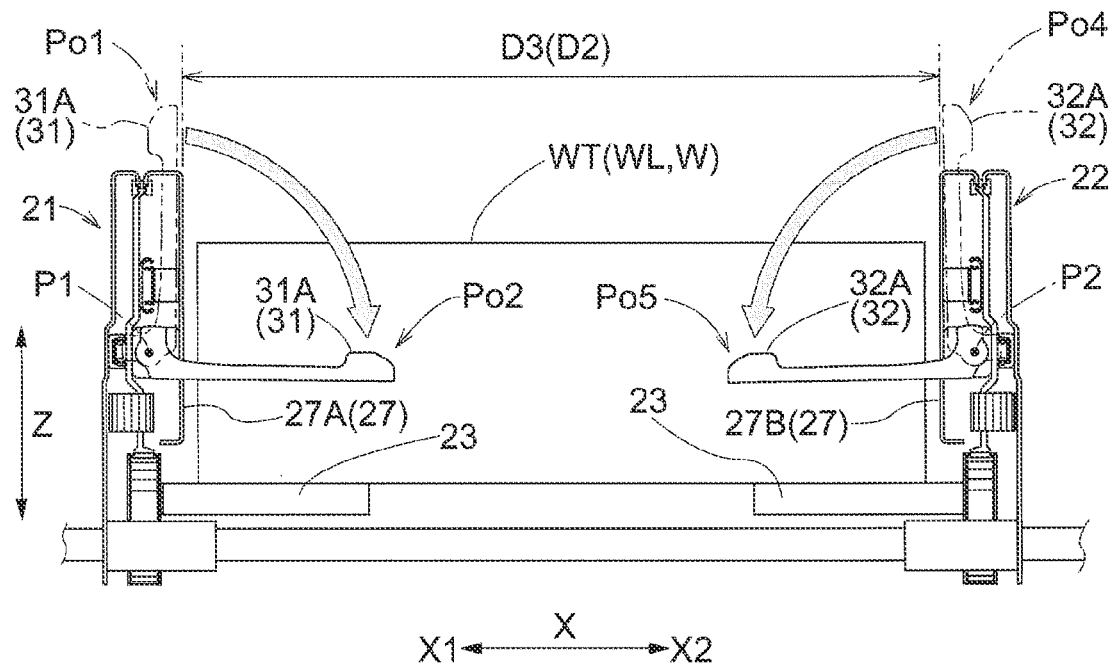
FIG. 14 is a front view illustrating operation of the first tilting control.
Figure 15:
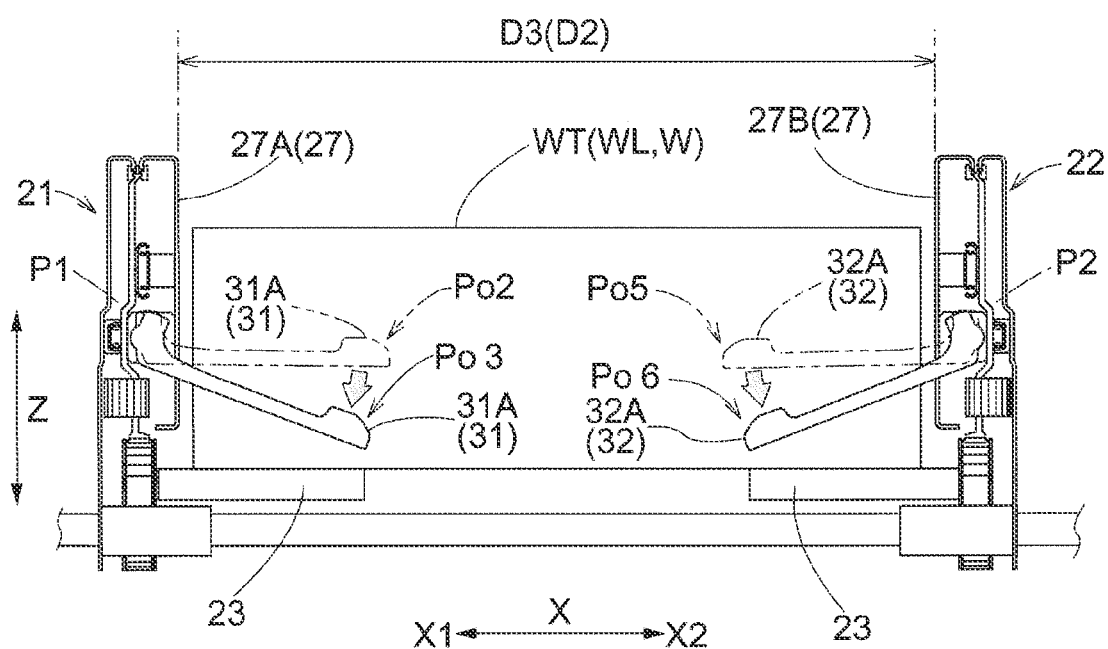
FIG. 15 is a front view illustrating operation of the first tilting control.
Figure 16:
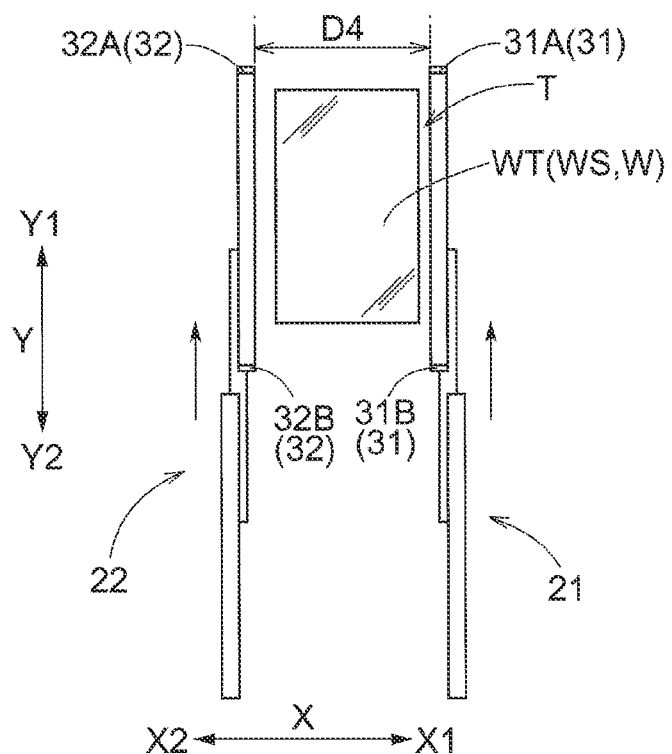
FIG. 16 is a plan view illustrating operation of the first protrusion control when the target article is a narrow article.

In this embodiment, as shown in FIGS. 10 to 22, the spacing changing unit 24 is capable of changing the spacing between the first arm 27A and the second arm 27B to a transfer spacing D3 and a retraction spacing D4. As shown in FIGS. 11 to 15 and FIGS. 17 to 22, the transfer spacing D3 is a spacing between the first arm 27A and the second arm 27B corresponding to the size of a target article WT in the first direction X, and is used when the target article WT is moved in the second direction Y by causing the first protruding/retracting unit 21 and the second protruding/retracting unit 22 to protrude and retract. In this example, when an article W whose size in the first direction X is smaller than a set value is defined as a narrow article WS, and an article W whose size in the first direction X is larger than or equal to the set value is defined as a wide article WL, the transfer spacing D3 is set to the first spacing D1 when the target article WT is a narrow article WS as shown in FIGS. 17 to 22, and the transfer spacing D3 is set to the second spacing D2 when the target article WT is a wide article WL as shown in FIGS. 11 to 15. As shown in FIGS. 10 and 16, the retraction spacing D4 is larger by a set distance than the transfer spacing D3, and is used when the first protruding/retracting unit 21 and the second protruding/retracting unit 22 protrude and retract without moving a target article WT in the second direction Y. Note that the retraction spacing D4 corresponds to a third spacing that is wider than the first spacing D1.

As shown in FIGS. 2 and 3, the spacing changing unit 24 includes a rotating belt 41, and a spacing motor M5 that rotates the rotating belt 41 in the longitudinal direction thereof. A connection portion, which is a part of the rotating belt 41, is connected to the base member 29 of the second protruding/retracting unit 22. The spacing changing unit 24 rotates the rotating belt 41 in the longitudinal direction thereof by driving the spacing motor M5 and thus moves the connection portion in the first direction X. As a result, the second protruding/retracting unit 22 is moved in the first direction X, and thus the spacing between the first arm 27A and the second arm 27B is changed. As described above, in this embodiment, the spacing changing unit 24 is configured to move only the second protruding/retracting unit 22, out of the first protruding/retracting unit 21 and the second protruding/retracting unit 22, in the first direction X and thus change the spacing between the first arm 27A and the second arm 27B.

As shown in FIG. 6, the article transport vehicle 1 includes a control unit H that controls the traveling body 6 and the transfer apparatus 7. The control unit H executes a travel control to cause the traveling body 6 to travel such that the transfer apparatus 7 is positioned at a set position corresponding to a target location T, and a transfer control to transfer a target article WT from the target location T to the transfer apparatus 7 or from the transfer apparatus 7 to the target location T, with the transfer apparatus 7 located at the set position. The transfer control includes a first transfer control and a second transfer control. The first transfer control is executed during a first transfer (receiving an article) in which the target article WT is transferred from the target location T to the transfer apparatus 7. The second transfer control is executed in a second transfer (delivering an article) in which the target article WT is transferred from the transfer apparatus 7 to the target location T. Note that the target location T is a location at which a target article WT is transferred by the transfer apparatus 7, and in this embodiment, the storage units 2, the storage relay conveyor 15, and the retrieval relay conveyor 16 correspond to the target location T.

When the target article WT is a wide article WL, the control unit H executes a first protrusion control, an approach control, a first tilting control, and a first withdrawal control during the first transfer control. When the target article WT is a narrow article WS, the control unit H executes the first protrusion control, the approach control, a second tilting control, and the first withdrawal control during the first transfer control.

In the first protrusion control, as shown in FIGS. 10 and 16, the control unit H controls the protruding/retracting drive unit 25 so as to cause the first protruding/retracting unit 21 and the second protruding/retracting unit 22 to protrude with the retraction spacing D4 therebetween. When the first protrusion control is executed, the first hook 31 and the second hook 32 are in the retracting orientation.

Figure 17:
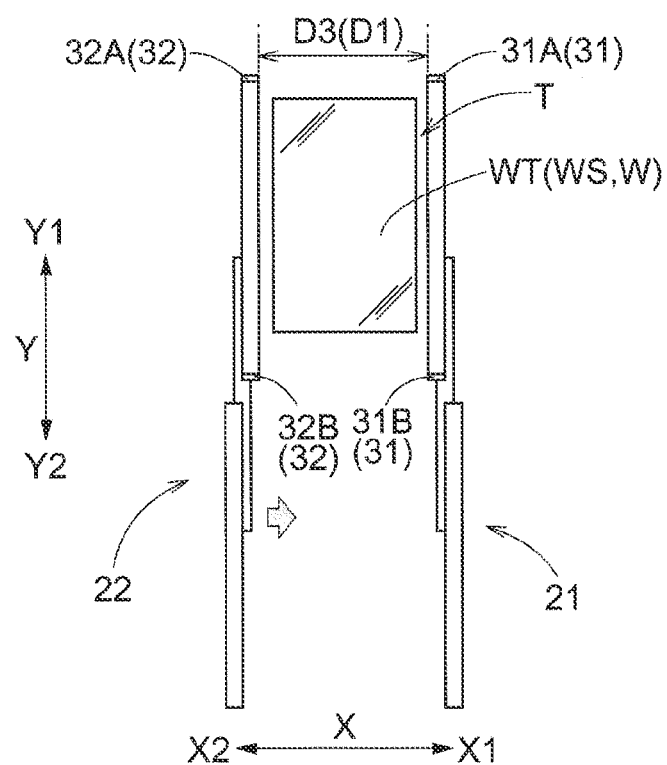
FIG. 17 is a plan view illustrating operation of the approach control when the target article is a narrow article.

In the approach control, as shown in FIGS. 11 and 17, the control unit H controls the spacing changing unit 24 so as to change the spacing between the first protruding/retracting unit 21 and the second protruding/retracting unit 22 from the retraction spacing D4 to the transfer spacing D3. Note that the transfer spacing D3 at this time is set to the second spacing D2 if the target article WT is a wide article WL as shown in FIG. 11, and set to the first spacing D1 if the target article WT is a narrow article WS as shown in FIG. 17.

Figure 12:
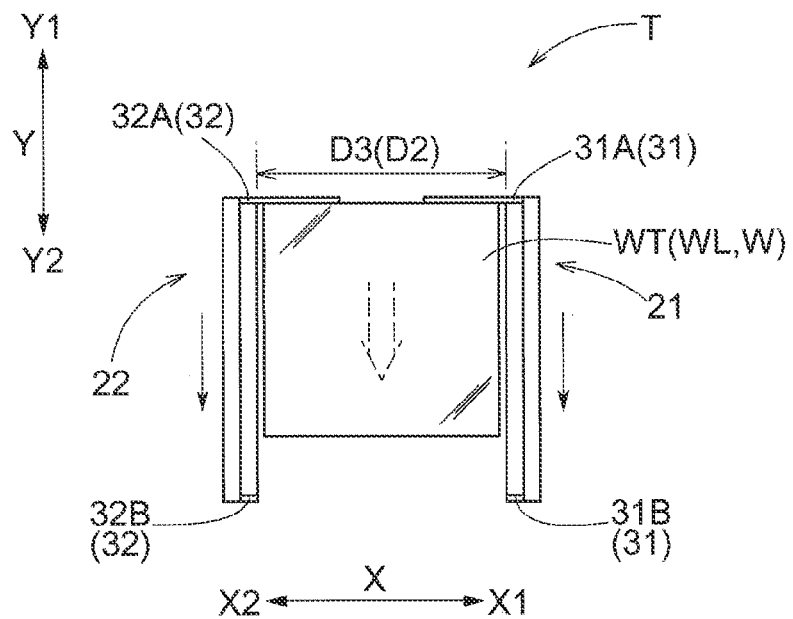
FIG. 12 is a plan view illustrating operation of a first withdrawal control when the target article is a wide article.

In the first withdrawal control, as shown in FIGS. 12 and 18, the protruding/retracting drive unit 25 is controlled so as to withdraw the first protruding/retracting unit 21 and the second protruding/retracting unit 22 with the transfer spacing D3 therebetween. In the first withdrawal control, the first hook 31 and the second hook 32 on the protruding side (the first-side first hook 31A and the first-side second hook 32A in the example shown in FIG. 17) are in the transferring orientation, and the first hook 31 and the second hook 32 on the withdrawn side (the second-side first hook 31B and the second-side second hook 32B in the example shown in FIG. 17) are in the retracting orientation.

Figure 13:
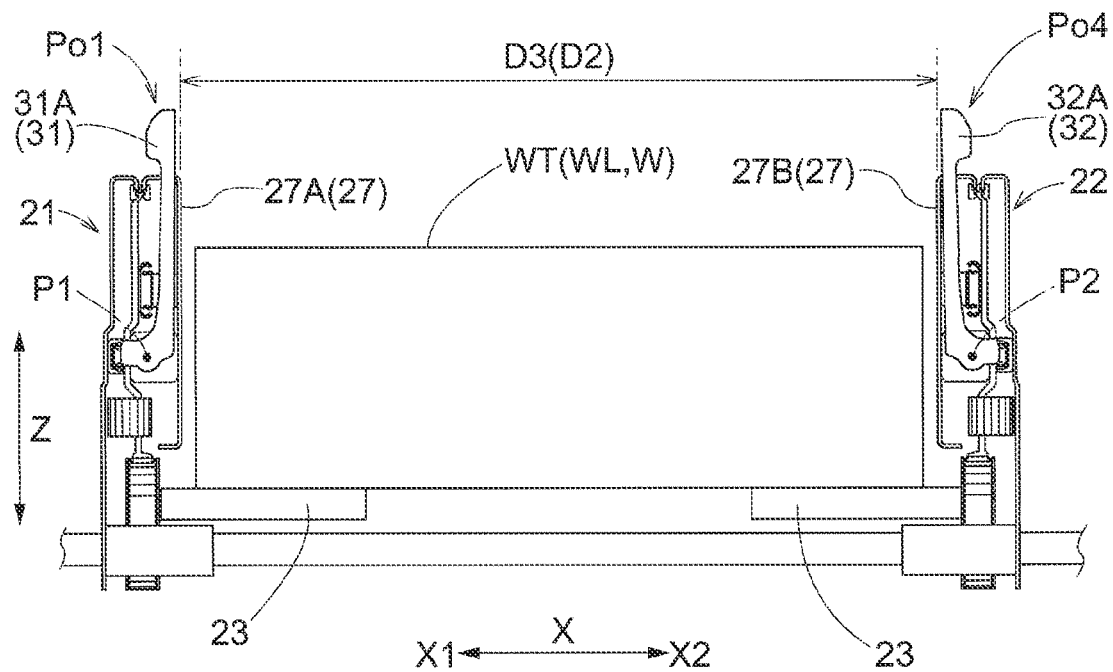
FIG. 13 is a front view illustrating operation of a first tilting control.

In the first tilting control, the control unit H controls the first swinging motor M2 and the second swinging motor M3 so as to perform an operation of changing the orientation of the first hook 31 from the first retracting orientation Po1 to the first transferring orientation Po3 and an operation of changing the orientation of the second hook 32 from the second retracting orientation Po4 to the second transferring orientation Po6 at the same time. In the first tilting control of this embodiment, the swinging speed of the first hook 31 and the swinging speed of the second hook 32 are the same, and, as shown in FIGS. 13 to 15, the control unit H controls the first swinging motor M2 and the second swinging motor M3 so as to simultaneously start the operation of changing the orientation of the first hook 31 from the first retracting orientation Po1 to the first transferring orientation Po3 and the operation of changing the orientation of the second hook 32 from the second retracting orientation Po4 to the second transferring orientation Po6 and simultaneously finish these operations. Accordingly, in the first tilting control, the second hook 32 is in the second intermediate orientation Po5 when the first hook 31 is in the first intermediate orientation Po2, as shown in FIG. 14. Note that, in the examples shown in FIGS. 19 to 21, the first hook 31 and the second hook 32 on the protruding side among the pair of first hooks 31 and the pair of second hooks 32 are the first hook 31 and the second hook 32 to be controlled in the first tilting control.

Figure 20:
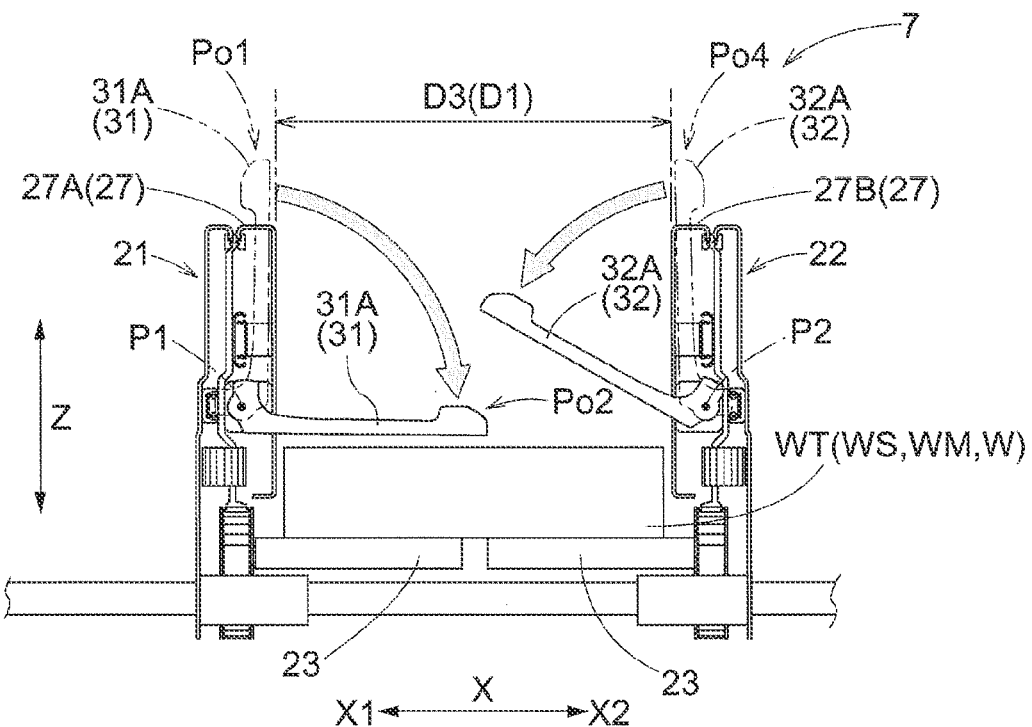
FIG. 20 is a front view illustrating operation of the second tilting control.
Figure 21:
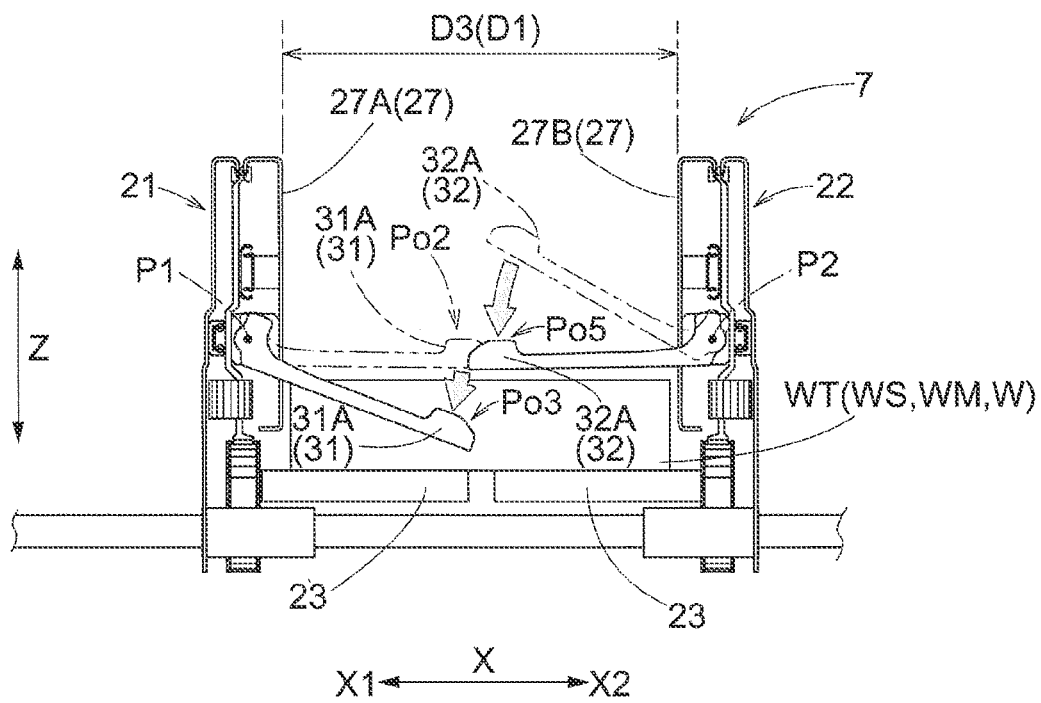
FIG. 21 is a front view illustrating operation of the second tilting control.
Figure 22:
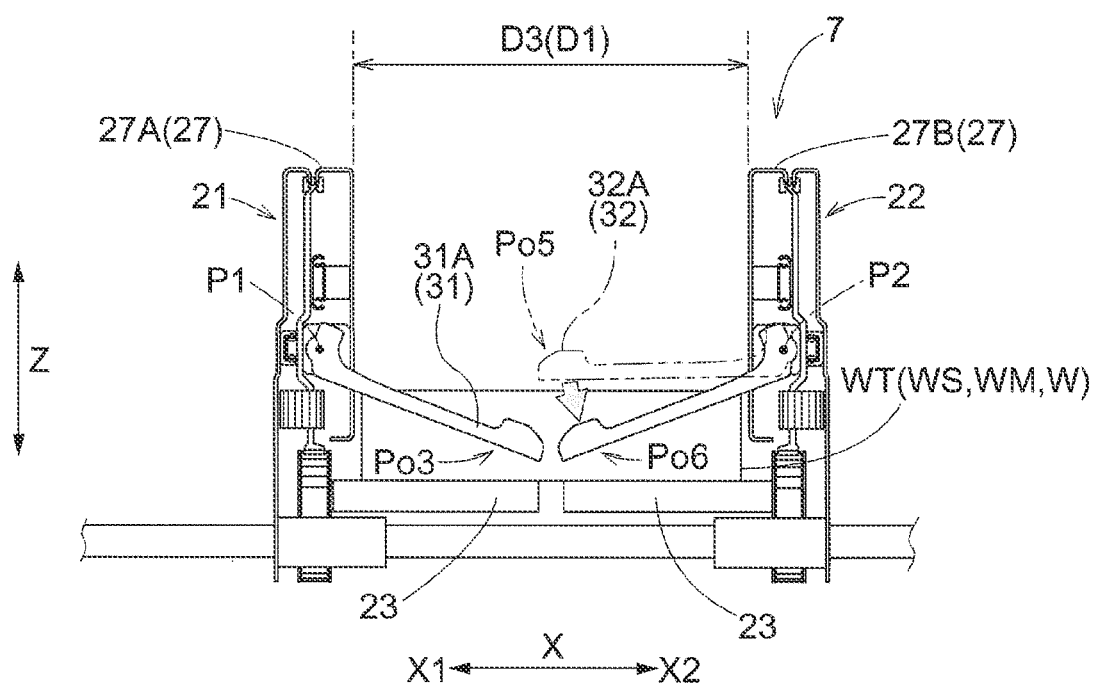
FIG. 22 is a front view illustrating operation of the second tilting control.

In the second tilted orientation, the control unit H controls the first swinging motor M2 and the second swinging motor M3 so as to perform the operation of changing the orientation of the first hook 31 from the first retracting orientation Po1 to the first transferring orientation Po3 and the operation of changing the orientation of the second hook 32 from the second retracting orientation Po4 to the second transferring orientation Po6 at different times. In the second tilting control of this embodiment, the swinging speed of the first hook 31 and the swinging speed of the second hook 32 in the second tilting control are the same, and, as shown in FIGS. 19 to 22, the control unit H controls the first swinging motor M2 and the second swinging motor M3 such that the second hook 32 starts to change the orientation from the second retracting orientation Po4 after a set period has elapsed since the first hook 31 started to change the orientation from the first retracting orientation Po1. Accordingly, in the second tilting control, the second hook 32 is not in the second intermediate orientation Po5 when the first hook 31 is in the first intermediate orientation Po2, and the first hook 31 is not in the first intermediate orientation Po2 when the second hook 32 is in the second intermediate orientation Po5, as shown in FIGS. 20 and 21. Note that, in this embodiment, the set period is shorter than time required to change the orientation of the first hook 31 from the first retracting orientation Po1 to the first intermediate orientation Po2. However, the set period needs to be longer than time required for the first hook 31 and the second hook 32 to approach each other to the extent that they interfere with each other. It is preferable that the set period is the shortest period to the extent that the first hook 31 and the second hook 32 do not interfere with each other in order to reduce time required to change the orientations of the first arm 27A and the second arm 27B. Note that, in the examples shown in FIGS. 19 to 22, the first hook 31 and the second hook 32 on the protruding side, among the pair of first hooks 31 and the pair of second hooks 32, are subjected to the first tilting control.

When the target article WT is a wide article WL, the control unit H executes a second protrusion control, a first erection control, a separation control, and a second withdrawal control during the second transfer control. When the target article WT is a narrow article WS, the control unit H executes the second protrusion control, a second erection control, the separation control, and the second withdrawal control during the second transfer control. The spacing changing unit 24 and the protruding/retracting drive unit 25 are controlled such that the second protrusion control, the separation control, and the second withdrawal control are respectively the inverses of the first withdrawal control, the approach control, and the first protrusion control. Note that, when the second protrusion control is executed, the first hook 31 and the second hook 32 on the withdrawn side are in the transferring orientation, and the first hook 31 and the second hook 32 on the protruding side are in the retracting orientation. When the second withdrawal control is executed, the first hooks 31 and the second hooks 32 are in the retracting orientation on both the protruding side and the withdrawn side.

In the first erection control, the control unit H controls the first swinging motor M2 and the second swinging motor M3 so as to perform an operation of changing the orientation of the first hook 31 from the first transferring orientation Po3 to the first retracting orientation Pot and an operation of changing the orientation of the second hook 32 from the second transferring orientation Po6 to the second retracting orientation Po4 at the same time. In the first erection control of this embodiment, the swinging speed of the first hook 31 and the swinging speed of the second hook 32 are the same, and the control unit H controls the first swinging motor M2 and the second swinging motor M3 so as to simultaneously start the operation of changing the orientation of the first hook 31 from the first transferring orientation Po3 to the first retracting orientation Po1 and the operation of changing the orientation of the second hook 32 from the second transferring orientation Po6 to the second retracting orientation Po4, and simultaneously finish these operations in the reverse of the movement shown in FIGS. 13 to 15. Accordingly, in the first erection control, the second hook 32 is in the second intermediate orientation Po5 when the first hook 31 is in the first intermediate orientation Po2.

In the second erect orientation, the control unit H controls the first swinging motor M2 and the second swinging motor M3 so as to perform the operation of changing the orientation of the first hook 31 from the first transferring orientation Po3 to the first retracting orientation Pot and the operation of changing the orientation of the second hook 32 from the second transferring orientation Po6 to the second retracting orientation Po4 at different times. In the second erection control of this embodiment, the swinging speed of the first hook 31 and the swinging speed of the second hook 32 in the second erection control are the same, and the control unit H controls the first swinging motor M2 and the second swinging motor M3 such that the first hook 31 starts to change the orientation from the first transferring orientation Po3 after the set period has elapsed since the second hook 32 started to change the orientation from the second transferring orientation Po6, in the reverse of the movement shown in FIGS. 19 to 22. Accordingly, in the second erection control, the second hook 32 is not in the second intermediate orientation Po5 when the first hook 31 is in the first intermediate orientation Po2, and the first hook 31 is not in the first intermediate orientation Po2 when the second hook 32 is in the second intermediate orientation Po5.

As described above, when the spacing between the first arm 27A and the second arm 27B is set to the first spacing D1 (when the target article WT is a narrow article WS), the control unit H performs the operation of changing the orientation of the first hook 31 between the first retracting orientation Po1 and the first transferring orientation Po3 and the operation of changing the orientation of the second hook 32 between the second retracting orientation Po4 and the second transferring orientation Po6 at different times. Further, when the spacing between the first arm 27A and the second arm 27B is set to the second spacing D2 (when the target article WT is a wide article WL), the control unit H performs the operation of changing the orientation of the first hook 31 between the first retracting orientation Pot and the first transferring orientation Po3 and the operation of changing the orientation of the second hook 32 between the second retracting orientation Po4 and the second transferring orientation Po6 at the same time.

When the transfer apparatus 7 receives an article W from the target location T, the control unit H executes the first protrusion control (protrusion control) to cause the first protruding/retracting unit 21 and the second protruding/retracting unit 22 to protrude with the retraction spacing D4 (third spacing) therebetween, the approach control to change the spacing between the first protruding/retracting unit 21 and the second protruding/retracting unit 22 from the retraction spacing D4 to the transfer spacing D3 (the first spacing D1 if the target article WT is a narrow article WS), the first withdrawal control (withdrawal control) to withdraw the first protruding/retracting unit 21 and the second protruding/retracting unit 22 with the transfer spacing D3 therebetween, and the second tilting control (orientation changing control) to change the orientation of the first hook 31 from the first retracting orientation Po1 to the first transferring orientation Po3 and the orientation of the second hook 32 is changed from the second retracting orientation Po4 to the second transferring orientation Po6 after the first approach control and before the first withdrawal control.

Figure 7:
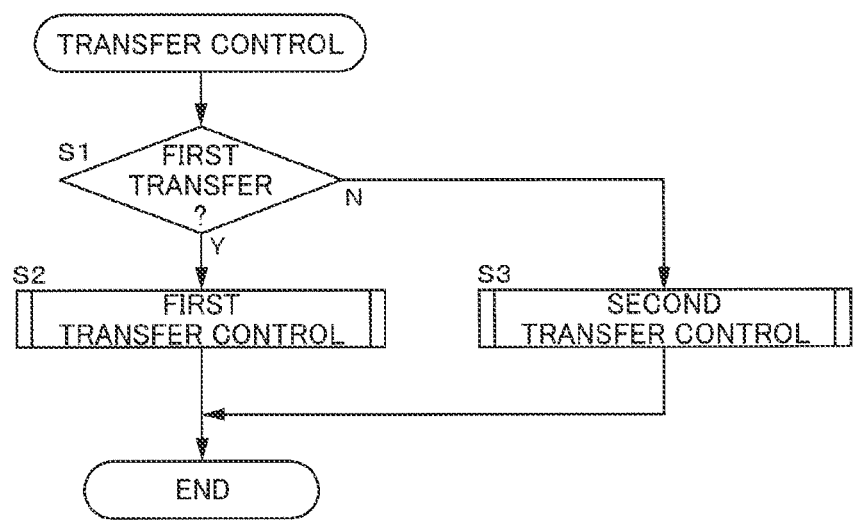
FIG. 7 is a flow chart of a transfer control.
Figure 8:
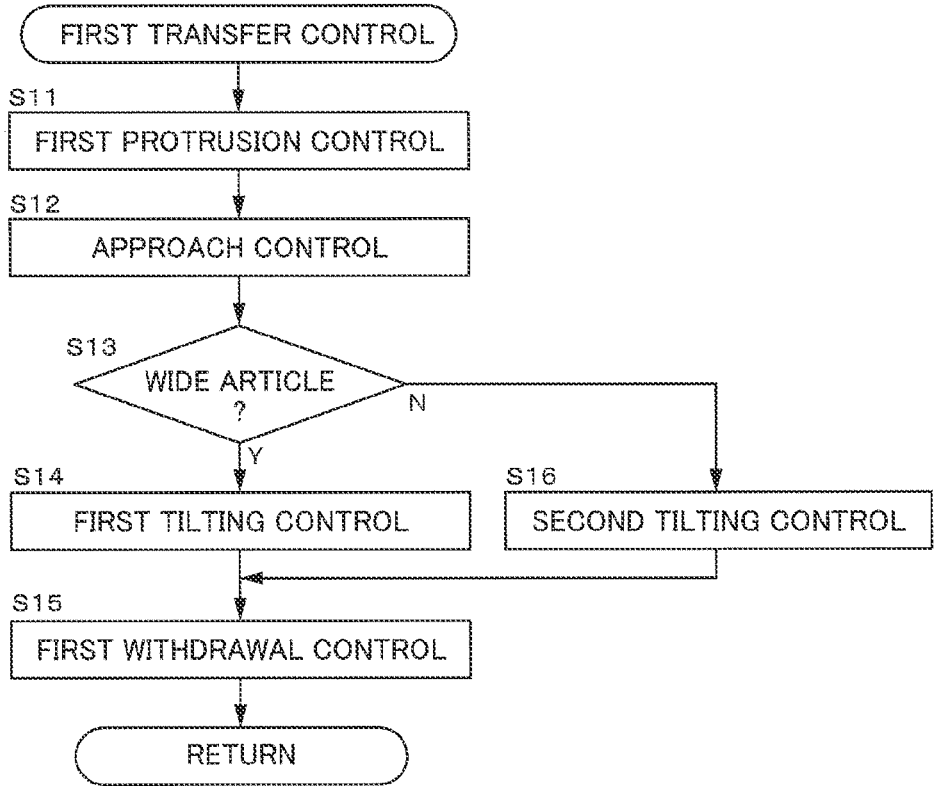
FIG. 8 is a flow chart of a first transfer control.
Figure 9:
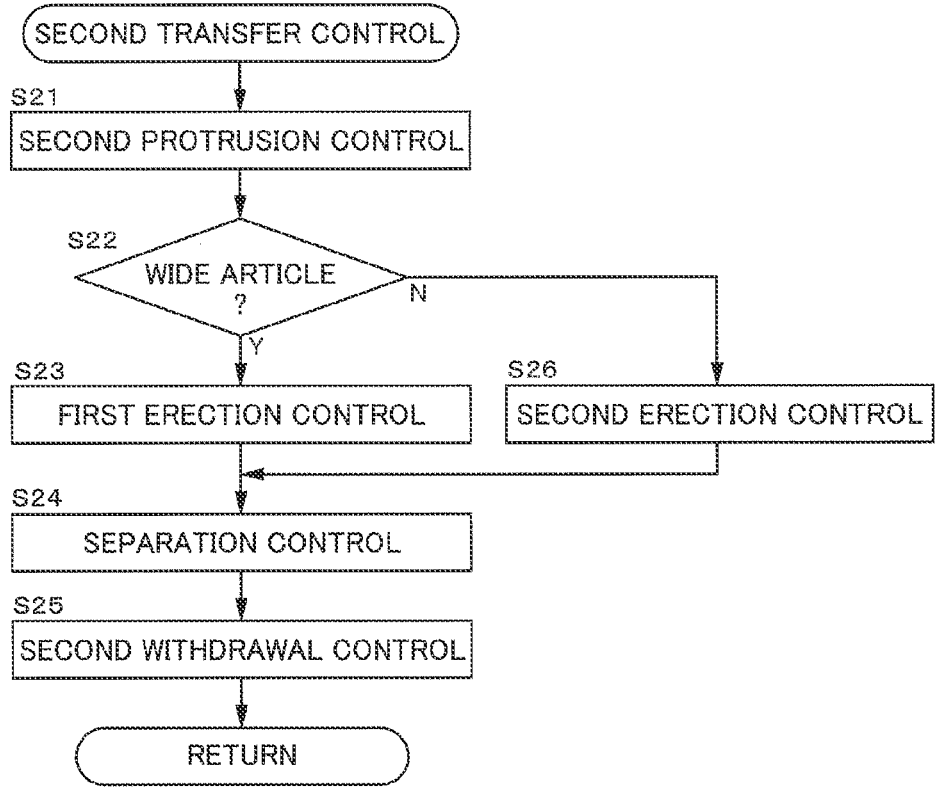
FIG. 9 is a flow chart of a second transfer control.

Next, the transfer control will be described with reference to the flow charts shown in FIGS. 7 to 9.

In the case of executing the transfer control, when the first transfer is performed to transfer the target article WT from the target location T to the transfer apparatus 7 is performed (S1: Y), the control unit H executes the first transfer control (S2). When the second transfer is performed to transfer the target article WT from the transfer apparatus 7 to the target location T is performed (S1: N), the control unit H executes the second transfer control (S3).

In the case of executing the first transfer control, when the target article WT is a wide article WL (S13: Y), the control unit H executes the first protrusion control (S11), the approach control (S12), the first tilting control (S14), and the first withdrawal control (S15), in the stated order, to transfer the target article WT, which is a wide article WL, from the target location T to the transfer apparatus 7. Further, in the case of executing the first transfer control, when the target article WT is a narrow article WS (S13: N), the control unit H executes the first protrusion control (S11), the approach control (S12), the second tilting control (S16), and the first withdrawal control (S15), in the stated order, to transfer the target article WT, which is a narrow article WS, from the target location T to the transfer apparatus 7.

In the case of executing the second transfer control is executed, when the target article WT is a wide article WL (S22: Y), the control unit H executes the second protrusion control (S21), the first erection control (S23), the separation control (S24), and the second withdrawal control (S25), in the stated order, to transfer the target article WT, which is a wide article WL, from the transfer apparatus 7 to the target location T. Further, in the case of executing the second transfer control, when the target article WT is a narrow article WS (S22: N), the control unit H executes the second protrusion control (S21), the second erection control (S26), the separation control (S24), and the second withdrawal control (S25), in the stated order, to transfer the target article WT, which is a narrow article WS, from the transfer apparatus 7 to the target location T.

2. Other Embodiments

The following is a description of other embodiments of the article transport apparatus.

(1) In the embodiment above, an exemplary configuration was described in which the operation of changing the orientation of the first hook 31 and the operation of changing the orientation of the second hook 32 are performed at different times if the spacing between the first arm 27A and the second arm 27B is set to the first spacing D1, and the operation of changing the orientation of the first hook 31 and the operation of changing the orientation of the second hook 32 are performed at the same time if the spacing between the first arm 27A and the second arm 27B is set to the second spacing D2. However, there is no limitation to such a configuration. For example, a configuration may be adopted in which the operation of changing the orientation of the first hook 31 between the first retracting orientation Po1 and the first transferring orientation Po3 and the operation of changing the orientation of the second hook 32 between the second retracting orientation Po4 and the second transferring orientation Po6 are performed at different times irrespective of the spacing between the first arm 27A and the second arm 27B.

(2) In the embodiment above, an exemplary configuration was described in which the end portion on the first direction second side X2 of the first hook 31 in the first retracting orientation Po1 is located above the end portion thereof on the first direction first side X1, and the end portion on the first direction second side X2 of the first hook 31 in the first transferring orientation Po3 is located below the end portion thereof on the first direction first side X1. However, there is no limitation to such a configuration. For example, a configuration may be adopted in which the end portion on the first direction second side X2 of the first hook 31 in the first retracting orientation Po1 is located below the end portion thereof on the first direction first side X1, and an end portion on the first direction second side X2 of the first hook 31 in the first transferring orientation Po3 is located above an end portion thereof on the first direction first side X1.

(3) In the embodiment above, an exemplary configuration was described in which the end portion on the first direction first side X1 of the second hook 32 in the second retracting orientation Po4 is located above the end portion thereof on the first direction second side X2, and the end portion on the first direction first side X1 of the second hook 32 in the second transferring orientation Po6 is located below the end portion thereof on the first direction second side X2. However, there is no limitation to such a configuration. For example, a configuration may be adopted in which the end portion on the first direction first side X1 of the second hook 32 in the second retracting orientation Po4 is located below the end portion thereof on the first direction second side X2, and the end portion on the first direction first side X1 of the second hook 32 in the second transferring orientation Po6 is located above the end portion thereof on the first direction second side X2. In such a case, in the state in which the first hook 31 is in the first retracting orientation Po1 and the second hook 32 is in the second retracting orientation Po4, the end portion on the first direction second side X2 of the first hook 31 and the end portion on the first direction first side X1 of the second hook 32 may be arranged on the same side in the vertical direction Z, or may be arranged on the opposite sides in the vertical direction Z.

(4) In the embodiment above, an exemplary configuration was described in which the first axis P1 and the second axis P2 are arranged above the upper end of a low article WM supported by the support portion 23. However, there is no limitation to such a configuration. For example, a configuration may be adopted in which one or both of the first axis P1 and the second axis P2 are arranged below the upper end of a low article WM supported by the support portion 23.

(5) In the embodiment above, an exemplary configuration was described in which the article transport vehicle 1 that is not provided with a lift body and that travels on the path located at a predetermined height is used as the article transport apparatus. However, there is no limitation to such a configuration. For example, a configuration may be adopted in which a stacker crane is the article transport apparatus and the transfer apparatus 7 is supported by a lift unit of the stacker crane.

(6) Note that the configurations disclosed in each of the above embodiments can be applied in combination with the configurations disclosed in other embodiments as long as no contradiction arises. Regarding those other configurations as well, the embodiments disclosed in the present specification are merely examples in all respects. Accordingly, various modifications can be made as appropriate in a range that does not depart from the gist of the present disclosure.

3. Summary of Embodiments

The following is a summary of the article transport apparatus described above.

An article transport apparatus includes: a transfer apparatus for moving an article in a transfer direction; and a movement apparatus for moving the transfer apparatus along a transport path, a direction orthogonal to the transfer direction when viewed in a vertical direction being defined as a width direction, one side in the width direction being defined as a width direction first side, a side opposite thereto being defined as a width direction second side, the transfer apparatus including: a first protruding/retracting unit capable of protruding and retracting in the transfer direction; a second protruding/retracting unit capable of protruding and retracting in the transfer direction and installed spaced apart from the first protruding/retracting unit on the width direction second side; a support portion for supporting an article; a spacing changing unit; and a control unit, the first protruding/retracting unit including: a first arm that protrudes and retracts in the transfer direction; and a first hook that is supported by the first arm and swings around a first axis extending in the transfer direction, the second protruding/retracting unit including: a second arm that protrudes and retracts in the transfer direction; and a second hook that is supported by the second arm and swings around a second axis extending in the transfer direction, the first hook being capable of swinging around the first axis to change an orientation thereof between a first retracting orientation, a first intermediate orientation, and a first transferring orientation in which an amount of protrusion from the first arm toward the width direction second side is larger than that in the first retracting orientation, the first intermediate orientation being located between the first retracting orientation and the first transferring orientation in a swinging path of the first hook, the first hook in the first intermediate orientation protruding from the first arm farthest toward the width direction second side, the second hook being capable of swinging around the second axis to change an orientation thereof between a second retracting orientation, a second intermediate orientation, and a second transferring orientation in which an amount of protrusion from the second arm toward the width direction first side is larger than that in the second retracting orientation, the second intermediate orientation being located between the second retracting orientation and the second transferring orientation in a swinging path of the second hook, the second hook in the second intermediate orientation protruding from the second arm farthest toward the width direction first side, an amount of protrusion of the first hook in the first intermediate orientation from the first arm toward the width direction second side being defined as a first intermediate-state protrusion amount, an amount of protrusion of the first hook in the first transferring orientation from the first arm toward the width direction second side being defined as a first transferring-state protrusion amount, an amount of protrusion of the second hook in the second intermediate orientation from the second arm toward the width direction first side being defined as a second intermediate-state protrusion amount, an amount of protrusion of the second hook in the second transferring orientation from the second arm toward the width direction first side being defined as a second transferring-state protrusion amount, the spacing changing unit being configured to change a spacing between the first arm and the second arm to a first spacing that is narrower than a sum of the first intermediate-state protrusion amount and the second intermediate-state protrusion amount and is wider than a sum of the first transferring-state protrusion amount and the second transferring-state protrusion amount, and the control unit performing an operation of changing the orientation of the first hook between the first retracting orientation and the first transferring orientation and an operation of changing the orientation of the second hook between the second retracting orientation and the second transferring orientation at different times.

With this configuration, the spacing changing unit changes the spacing between the first protruding/retracting unit and the second protruding/retracting unit in the width direction, and thus the spacing therebetween in the width direction can be set to a spacing that corresponds to the size of the article in the width direction. An article between the first protruding/retracting unit and the second protruding/retracting unit can be transferred between the support portion and a target location by causing the first protruding/retracting unit and the second protruding/retracting unit to protrude and retract in the transfer direction with the spacing between the first protruding/retracting unit and the second protruding/retracting unit being the spacing that corresponds to the size of the article in the width direction.

The spacing changing unit can change the spacing between the first arm and the second arm to the first spacing that is narrower than the sum of the first intermediate-state protrusion amount and the second intermediate-state protrusion amount. Even when the spacing between the first arm and the second arm is set to the first spacing, the first hook and the second hook can be appropriately prevented from interfering with each other by performing an operation of changing the orientation of the first hook and an operation of changing the orientation of the second hook at different times. Accordingly, the spacing in the width direction between the first hook in the first transferring orientation and the second hook in the second transferring orientation can be narrowed while preventing the first hook and the second hook from interfering with each other.

Here, it is preferable to adopt a configuration in which the spacing changing unit is configured to change the spacing between the first arm and the second arm to not only the first spacing but also a second spacing that is wider than the sum of the first intermediate-state protrusion amount and the second intermediate-state protrusion amount, and if the spacing between the first arm and the second arm is the first spacing, the control unit performs the operation of changing the orientation of the first hook between the first retracting orientation and the first transferring orientation and the operation of changing the orientation of the second hook between the second retracting orientation and the second transferring orientation at different times, and if the spacing between the first protruding/retracting unit and the second protruding/retracting unit is the second spacing, the control unit performs the operation of changing the orientation of the first hook between the first retracting orientation and the first transferring orientation and the operation of changing the orientation of the second hook between the second retracting orientation and the second transferring orientation at the same time.

With this configuration, if the spacing between the first arm and the second arm is the first spacing, the first hook and the second hook can be prevented from interfering with each other by performing an operation of changing the orientation of the first hook and an operation of changing the orientation of the second hook at different times. If the spacing between the first arm and the second arm is the second spacing, there is no risk that the first arm and the second arm interfere with each other, and therefore, the operation of changing the orientation of the first arm and the operation of changing the orientation of the second arm can be completed in a shorter period of time by performing these operations at the same time compared with the case of changing the orientations of the first and second arms at different times.

Further, it is preferable to adopt a configuration in which the spacing changing unit is configured to change the spacing between the first arm and the second arm to not only the first spacing but also a third spacing that is wider than the first spacing, and when the transfer apparatus receives an article from a target location, the control unit executes a protrusion control to cause the first protruding/retracting unit and the second protruding/retracting unit to protrude with the third spacing therebetween, an approach control to change the spacing between the first protruding/retracting unit and the second protruding/retracting unit from the third spacing to the first spacing, a withdrawal control to withdraw the first protruding/retracting unit and the second protruding/retracting unit with the first spacing therebetween, and an orientation changing control to change the orientation of the first hook from the first retracting orientation to the first transferring orientation and the orientation of the second hook from the second retracting orientation to the second transferring orientation after the approach control and before the withdrawal control.

With this configuration, the approach control is executed after the protrusion control, thereby keeping the spacing between the first arm portion and the second arm portion wide when the protrusion control is executed. Thus, the first arm portion and the second arm portion can be prevented from coming into contact with an article on the target location when the protrusion control is executed. The first hook and the second hook can be brought into contact with the article to move the article toward the transfer apparatus by withdrawing the first arm portion and the second arm portion with the first hook and the second hook protruding. The transfer apparatus can receive an article from the target location by executing the protrusion control, the approach control, the orientation changing control, and the withdrawal control in this manner.

In the case where the orientation changing control is executed after the approach control, the first hook and the second hook are highly likely to interfere with each other when the orientations of the first hook and the second hook are changed. However, the first hook and the second hook can be prevented from interfering with each other by performing the operation of changing the orientation of the first hook and the operation of changing the orientation of the second hook at different times as described above.

Further, it is preferable to adopt a configuration in which an end portion on the width direction second side of the first hook in the first retracting orientation is located above an end portion thereof on the width direction first side, the first hook in the first intermediate orientation extends in the width direction, and an end portion on the width direction second side of the first hook in the first transferring orientation is located below an end portion thereof on the width direction first side, and an end portion on the width direction first side of the second hook in the second retracting orientation is located above an end portion thereof on the width direction second side, the second hook in the second intermediate orientation extends in the width direction, and an end portion of the second hook in the second transferring orientation on the width direction first side is located below an end portion thereof on the width direction second side.

With this configuration, even when the first axis of the first hook and the second axis of the second hook are arranged at relatively high positions owing to the arrangement or sizes of surrounding members, the end portion on the width direction second side of the first hook can be positioned below the first axis, and an end of the second hook on the width direction first side can be positioned below the second axis. Accordingly, the leading-end portion of the first hook in the first transferring orientation and the leading-end portion of the second hook in the second transferring orientation can be brought into contact with portions of an article that are located below the first axis and the second axis.

Further, it is also preferable to adopt a configuration in which the lowest article among target articles that are articles to be transferred by the transfer apparatus is defined as a low article, and the first axis and the second axis are arranged above an upper end of the low article supported by the support portion.

As mentioned above, with this configuration, the leading-end portion of the first hook in the first transferring orientation can be positioned below the first axis, and the leading-end portion of the second hook in the second transferring orientation can be positioned below the second axis. Thus, the first hook in the first transferring orientation and the second hook in the second transferring orientation can be brought into contact also with a low article with a low height.

INDUSTRIAL APPLICABILITY

The technology according to this disclosure can be used for an article transport apparatus that includes a transfer apparatus for moving an article in a transfer direction and a movement apparatus for moving the transfer apparatus along a transport path.

DESCRIPTION OF REFERENCE SIGNS

1: Article transport vehicle (article transport apparatus)
6: Traveling body (movement apparatus)
7: Transfer apparatus
21: First protruding/retracting unit
22: Second protruding/retracting unit
23: Support portion
24: Spacing changing unit
27A: First arm
27B: Second arm
31: First hook
32: Second hook
H: Control unit
L1: First intermediate-state protrusion amount
L2: First transferring-state protrusion amount
L3: Second intermediate-state protrusion amount
L4: Second transferring-state protrusion amount
P1: First axis
P2: Second axis
Po1: First retracting orientation
Po2: First intermediate orientation
Po3: First transferring orientation
Po4: Second retracting orientation
Po5: Second intermediate orientation
Po6: Second transferring orientation
D1: First spacing
D2: Second spacing
D4: Retraction spacing (third spacing)
W: Article
WM: Low article
X: First direction (width direction)
X1: First direction first side (width direction first side)
X2: First direction second side (width direction second side)
Y: Second direction (transfer direction)
Z: Vertical direction

The invention claimed is:
1. An article transport apparatus comprising:
a transfer apparatus for moving an article in a transfer direction; and
a movement apparatus for moving the transfer apparatus along a transport path,
wherein:
a direction orthogonal to the transfer direction when viewed in a vertical direction is a width direction,
one side in the width direction is a width direction first side, and
a side opposite thereto is a width direction second side,
the transfer apparatus comprising:
a first protruding/retracting unit capable of protruding and retracting in the transfer direction;
a second protruding/retracting unit capable of protruding and retracting in the transfer direction and installed spaced apart from the first protruding/retracting unit on the width direction second side;
a support portion for supporting an article;
a spacing changing unit; and
a control unit,
the first protruding/retracting unit comprising:
a first arm that protrudes and retracts in the transfer direction; and
a first hook that is supported by the first arm and swings around a first axis extending in the transfer direction,
the second protruding/retracting unit comprising:
a second arm that protrudes and retracts in the transfer direction; and
a second hook that is supported by the second arm and swings around a second axis extending in the transfer direction,
wherein the first hook is configured to swing around the first axis to change an orientation thereof between a first retracting orientation, a first intermediate orientation, and a first transferring orientation in which an amount of protrusion from the first arm toward the width direction second side is larger than that in the first retracting orientation,
wherein the first intermediate orientation is located between the first retracting orientation and the first transferring orientation in a swinging path of the first hook, the first hook in the first intermediate orientation protruding from the first arm farthest toward the width direction second side,
wherein the second hook is configured to swing around the second axis to change an orientation thereof between a second retracting orientation, a second intermediate orientation, and a second transferring orientation in which an amount of protrusion from the second arm toward the width direction first side is larger than that in the second retracting orientation,
wherein the second intermediate orientation is located between the second retracting orientation and the second transferring orientation in a swinging path of the second hook, the second hook in the second intermediate orientation protruding from the second arm farthest toward the width direction first side,
wherein an amount of protrusion of the first hook in the first intermediate orientation from the first arm toward the width direction second side is a first intermediate-state protrusion amount, an amount of protrusion of the first hook in the first transferring orientation from the first arm toward the width direction second side is a first transferring-state protrusion amount,
wherein an amount of protrusion of the second hook in the second intermediate orientation from the second arm toward the width direction first side is a second intermediate-state protrusion amount, an amount of protrusion of the second hook in the second transferring orientation from the second arm toward the width direction first side is a second transferring-state protrusion amount,
wherein the spacing changing unit is configured to change a spacing between the first arm and the second arm to a first spacing that is narrower than a sum of the first intermediate-state protrusion amount and the second intermediate-state protrusion amount and is wider than a sum of the first transferring-state protrusion amount and the second transferring-state protrusion amount, and wherein the control unit performs an operation of changing the orientation of the first hook between the first retracting orientation and the first transferring orientation and an operation of changing the orientation of the second hook between the second retracting orientation and the second transferring orientation at different times.

2. The article transport apparatus according to claim 1, wherein:

the spacing changing unit is configured to change the spacing between the first arm and the second arm to the first spacing and also a second spacing that is wider than the sum of the first intermediate-state protrusion amount and the second intermediate-state protrusion amount, and if the spacing between the first arm and the second arm is the first spacing, the control unit performs the operation of changing the orientation of the first hook between the first retracting orientation and the first transferring orientation and the operation of changing the orientation of the second hook between the second retracting orientation and the second transferring orientation at different times, and if the spacing between the first arm and the second arm is the second spacing, the control unit performs the operation of changing the orientation of the first hook between the first retracting orientation and the first transferring orientation and the operation of changing the orientation of the second hook between the second retracting orientation and the second transferring orientation at the same time.

3. The article transport apparatus according to claim 2, wherein:

the spacing changing unit is configured to change the spacing between the first arm and the second arm to the first spacing and also a third spacing that is wider than the first spacing, and when the transfer apparatus receives an article from a target location, the control unit executes a protrusion control to cause the first protruding/retracting unit and the second protruding/retracting unit to protrude with the third spacing therebetween, an approach control to change the spacing between the first protruding/retracting unit and the second protruding/retracting unit from the third spacing to the first spacing, a withdrawal control to withdraw the first protruding/retracting unit and the second protruding/retracting unit with the first spacing therebetween, and an orientation changing control to change the orientation of the first hook from the first retracting orientation to the first transferring orientation and the orientation of the second hook from the second retracting orientation to the second transferring orientation after the approach control and before the withdrawal control.

4. The article transport apparatus according to claim 2, wherein:

an end portion on the width direction second side of the first hook in the first retracting orientation is located above an end portion thereof on the width direction first side, the first hook in the first intermediate orientation extends in the width direction, and an end portion on the width direction second side of the first hook in the first transferring orientation is located below an end portion thereof on the width direction first side, and an end portion on the width direction first side of the second hook in the second retracting orientation is located above an end portion thereof on the width direction second side, the second hook in the second intermediate orientation extends in the width direction, and an end portion on the width direction first side of the second hook in the second transferring orientation is located below an end portion thereof on the width direction second side.

5. The article transport apparatus according to claim 2, wherein:

an orientation changing period is shorter in a case where the spacing between the first arm and the second arm is the second spacing than in a case where the spacing between the first arm and the second arm is the first spacing, the orientation changing period extending from a start of at least one of the operation of changing the orientation of the first hook between the first retracting orientation and the first transferring orientation and the operation of changing the orientation of the second hook between the second retracting orientation and the second transferring orientation to a completion of both of the operations.

6. The article transport apparatus according to claim 1, wherein:

the spacing changing unit is configured to change the spacing between the first arm and the second arm to the first spacing and also a third spacing that is wider than the first spacing, and when the transfer apparatus receives an article from a target location, the control unit executes a protrusion control to cause the first protruding/retracting unit and the second protruding/retracting unit to protrude with the third spacing therebetween, an approach control to change the spacing between the first protruding/retracting unit and the second protruding/retracting unit from the third spacing to the first spacing, a withdrawal control to withdraw the first protruding/retracting unit and the second protruding/retracting unit with the first spacing therebetween, and an orientation changing control to change the orientation of the first hook from the first retracting orientation to the first transferring orientation and the orientation of the second hook from the second retracting orientation to the second transferring orientation after the approach control and before the withdrawal control.

7. The article transport apparatus according to claim 6, wherein:

an end portion on the width direction second side of the first hook in the first retracting orientation is located above an end portion thereof on the width direction first side, the first hook in the first intermediate orientation extends in the width direction, and an end portion on the width direction second side of the first hook in the first transferring orientation is located below an end portion thereof on the width direction first side, and an end portion on the width direction first side of the second hook in the second retracting orientation is located above an end portion thereof on the width direction second side, the second hook in the second intermediate orientation extends in the width direction, and an end portion on the width direction first side of the second hook in the second transferring orientation is located below an end portion thereof on the width direction second side.

8. The article transport apparatus according to claim 1, wherein:

an end portion on the width direction second side of the first hook in the first retracting orientation is located above an end portion thereof on the width direction first side, the first hook in the first intermediate orientation extends in the width direction, and an end portion on the width direction second side of the first hook in the first transferring orientation is located below an end portion thereof on the width direction first side, and an end portion on the width direction first side of the second hook in the second retracting orientation is located above an end portion thereof on the width direction second side, the second hook in the second intermediate orientation extends in the width direction, and an end portion on the width direction first side of the second hook in the second transferring orientation is located below an end portion thereof on the width direction second side.

9. The article transport apparatus according to claim 8, wherein:

the lowest article among target articles that are articles to be transferred by the transfer apparatus is defined as a low article, and the first axis and the second axis are arranged above an upper end of the low article supported by the support portion.

10. The article transport apparatus according to claim 1, wherein:

in response to the spacing between the first arm and the second arm being the first spacing, the control unit starts the operation of changing the orientation of the second hook from the second retracting orientation to the second transferring orientation after a set period has elapsed since the control unit started the operation of changing the orientation of the first hook from the first retracting orientation to the first transferring orientation, the set period being shorter than time required to change the orientation of the first hook from the first retracting orientation to the first intermediate orientation.

\* \* \* \* \*